United States Patent
Ryu et al.

(10) Patent No.: US 11,706,764 B2
(45) Date of Patent: Jul. 18, 2023

(54) RESOURCE SELECTION WITH SIDELINK RECEIVER SENSING

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Chester, NJ (US); Jing Sun, San Diego, CA (US); Xiaoxia Zhang, San Diego, CA (US); Tao Luo, San Diego, CA (US); Arumugam Chendamarai Kannan, San Diego, CA (US); Juan Montojo, San Diego, CA (US); Xiaojie Wang, Hillsborough, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 74 days.

(21) Appl. No.: 17/105,470

(22) Filed: Nov. 25, 2020

(65) Prior Publication Data

US 2022/0167330 A1    May 26, 2022

(51) Int. Cl.
*H04W 4/00* (2018.01)
*H04W 72/20* (2023.01)
*H04W 72/542* (2023.01)

(52) U.S. Cl.
CPC ......... *H04W 72/20* (2023.01); *H04W 72/542* (2023.01)

(58) Field of Classification Search
CPC ........... H04W 72/0406; H04W 72/085; H04W 28/04; H04W 72/04; H04W 72/042; H04W 88/08; H04L 5/0007
See application file for complete search history.

(56) References Cited

U.S. PATENT DOCUMENTS 11,395,313 B2    7/2022  Bharadwaj et al.
2016/0219620 A1 *  7/2016  Lee ........................ H04W 76/14
(Continued)

FOREIGN PATENT DOCUMENTS

EP    3806558 A1    4/2021
EP    3579633 B1 *  1/2023  ............. H04L 5/003
(Continued)

OTHER PUBLICATIONS

Asustek: "Discussion on Sidelink Structure in NR V2X", 3GPP Draft, 3GPP TSG RAN WG1 #98, R1-1909305 Discussion on Sidelink Structure in NR V2X, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019 Aug. 16, 2019 (Aug. 16, 2019), 6 Pages, XP051765912, Retrieved from the Internet: URL: http://www.3gpp.org/ftp/tsg_ran/WG1_RL1/TSGR1_98/Docs/R1-1909305.zip [retrieved on Aug. 16, 2019] p. 5, line 16-line 24.
(Continued)

*Primary Examiner* — Phuongchau Ba Nguyen
(74) *Attorney, Agent, or Firm* — Holland & Hart LLP; Nerrie M. Zohn

(57) ABSTRACT

Methods, systems, and devices for wireless communications are described. In some examples, a first UE may receive an indication of first resources from a second UE. In some examples, the second UE may be a UE configured to receive a transmission from a third UE over the first resources. In some such examples, the first UE may transmit, to a fourth UE, a sidelink transmission over available resources that exclude the first resources. Additionally, or alternatively, the second UE may be a UE that received sidelink control information from the third UE indicating the resources for transmission by the third UE to a fourth UE. In some such examples, the first UE may transmit, to the second UE, a
(Continued)

sidelink transmission over available resources that exclude the first resources.

21 Claims, 15 Drawing Sheets

(56) References Cited

U.S. PATENT DOCUMENTS

| | | | | |
|---|---|---|---|---|
| 2016/0316487 | A1* | 10/2016 | Kalhan | H04W 76/14 |
| 2016/0338094 | A1* | 11/2016 | Faurie | H04W 72/085 |
| 2016/0381720 | A1* | 12/2016 | Baek | H04W 8/14 370/329 |
| 2017/0339671 | A1* | 11/2017 | Lee | H04W 72/0446 |
| 2018/0077552 | A1* | 3/2018 | Lee | H04W 76/27 |
| 2018/0084478 | A1* | 3/2018 | Lee | H04W 28/12 |
| 2019/0246385 | A1* | 8/2019 | Lin | H04L 5/0094 |
| 2020/0092685 | A1* | 3/2020 | Fehrenbach | H04W 36/18 |
| 2020/0229171 | A1* | 7/2020 | Khoryaev | H04B 7/0413 |
| 2020/0322024 | A1* | 10/2020 | Cheng | H04B 17/327 |
| 2021/0250913 | A1* | 8/2021 | Ganesan | H04W 28/26 |
| 2022/0029756 | A1* | 1/2022 | Sarkis | H04W 72/0446 |
| 2022/0167376 | A1* | 5/2022 | Ryu | H04W 72/02 |
| 2022/0201667 | A1* | 6/2022 | Wang | H04W 74/0816 |
| 2022/0225280 | A1* | 7/2022 | Yang | H04W 52/0216 |
| 2022/0287005 | A1* | 9/2022 | Huang | H04W 24/10 |
| 2022/0303982 | A1* | 9/2022 | Hosseini | H04W 28/26 |
| 2022/0312379 | A1* | 9/2022 | Xue | H04W 74/0833 |
| 2022/0330275 | A1* | 10/2022 | Dong | H04L 1/18 |
| 2023/0030900 | A1* | 2/2023 | Xue | H04W 72/02 |

FOREIGN PATENT DOCUMENTS

| | | | |
|---|---|---|---|
| WO | WO-2020014985 | A1 | 1/2020 |
| WO | WO-2020146629 | | 7/2020 |
| WO | WO-2020173536 | A1 | 9/2020 |
| WO | WO-2022132560 | A1 * | 6/2022 ............ H04W 4/46 |

OTHER PUBLICATIONS

Interdigital, et al., "NR Sidelink Resource Allocation Mechanism for Mode 2", 3GPP Draft, 3GPP TSG RAN WG1 #98, R1-1909030 NR Sidelink Resource Allocation Mechanism for Mode 2 Final, 3rd Generation Partnership Project (3GPP), Mobile Competence Centre, 650, Route Des Lucioles, F-06921, Sophia-Antipolis Cedex, France, vol. RAN WG1, No. Prague, Czech, Aug. 26, 2019-Aug. 30, 2019, Aug. 16, 2019 (Aug. 16, 2019), XP051765634, 6 pages, Retrieved from the Internet: URL: http://www.3gpp.org/ftp/tsg_ran/WG1_RL1/TSGR1_98/Docs/R1-1909030.zip [retrieved on Aug. 16, 2019] paragraph [02. 3]-paragraph [02 .4].
International Search Report and Written Opinion—PCT/US2021/072595—ISA/EPO—dated Mar. 24, 2022 (2100401WO).
3GPP TS 38.212, "3rd Generation Partnership Project; Technical Specification Group Radio Access Network; NR; Multiplexing and Channel Coding (Release 16)", 3GPP TS 38.212, V16.3.0, Sep. 2020, pp. 1-147.
3GPP TS 38.214, "3rd Generation Partnership Project, Technical Specification Group Radio Access Network, NR, Physical Layer Procedures for Data (Release 16)", V16.3.0, Sep. 2020, 165 Pages, Section 8.1.4.
3GPP TS 38.321, "3rd Generation Partnership Project, Technical Specification Group Radio Access Network, NR, Medium Access Control (MAC) Protocol Specification (Release 16)", 3GPP TS 38.321, V16.2.1, Sep. 2020, 153 Pages.
LG Electronics: "Discussion on Feasibility and Benefits for Mode 2 Enhancement", 3GPP TSG RAN WG1 Meeting #102-e, R1-2005749, 3GPP, Mobile Competence Centre, France, vol. RAN WG1, No. e-Meeting, Aug. 17, 2020-Aug. 28, 2020, Aug. 8, 2020, XP051917712, 9 Pages, Section 1, p. 1 Section 2.1, p. 1-p. 2, Figure 1 p. 3, Figure 3, pp. 1 and 2, Sub-Section Extension of Resource Reservation 11 and p. 4, Sub-Sections, "Release of Reserved Resources" and "Recommendation of Transmission Characteristics During a Certain Time Duration".

* cited by examiner

RESOURCE SELECTION WITH SIDELINK RECEIVER SENSING

FIELD OF TECHNOLOGY

The following relates to wireless communications, including resource selection with sidelink receiver sensing and sidelink transmitter sensing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as UE. Some wireless communications systems may support sidelink communications between UEs over resources of a sidelink channel. Improved techniques for resource selection for sidelink communications are desired.

SUMMARY

The described techniques relate to improved methods, systems, devices, and apparatuses that support resource selection with sidelink receiver sensing and sidelink transmitter sensing. Generally, the described techniques provide for resource selection for sidelink communications based on sensing at a transmitting user equipment (UE) or a receiving UE.

A first UE may monitor for sidelink messages among multiple UEs using transmission-side sensing. In some aspects, the first UE may monitor for sidelink messages over a transmit beam selected for transmitting data from the first UE to a second UE. The first UE may receive, over the transmit beam and from a third UE, a sidelink message including an indication of reserved resources (e.g., resources reserved by a fourth UE for transmitting a sidelink message to the third UE). Based on the indication, the first UE may select available resources over which to transmit data (e.g., a sidelink message including data) to the second UE. Accordingly, the first UE may determine resources reserved by UEs for sidelink messages (e.g., the fourth UE) under conditions (e.g., positioning, physical obstacles) in which the first UE is unable to receive sidelink messages from the UEs. In some aspects, the received sidelink message including the indication of reserved resources may include a sidelink feedback channel transmission (e.g., a physical sidelink feedback channel (PSFCH) transmission). In some other aspects, the received sidelink message may be a sidelink control channel message or a sidelink data transmission (e.g., a physical sidelink shared channel (PSSCH) transmission).

Additionally, or alternatively, the second UE may monitor for sidelink messages among multiple UEs using receiver-side sensing. In some examples, the second UE may monitor for sidelink messages over a receive beam selected for receiving data at the second UE from the first UE. The second UE may receive, over the receive beam and from the fourth UE, a sidelink message including an indication of reserved resources (e.g., resources reserved by the fourth UE for transmitting a sidelink message to the third UE). Based on the indication, the second UE may select available resources over which to receive data from the first UE and may transmit an indication of the available resources to the first UE. Alternatively, the second UE may transmit an indication of the reserved resources to the first UE and may receive the data over resources exclusive of the reserved resources. Accordingly, the second UE may determine resources reserved by UEs for sidelink messages (e.g., the fourth UE) under conditions (e.g., positioning, physical obstacles) in which the first UE is unable to receive sidelink messages from the fourth UE.

A method for wireless communication at a first user equipment (UE) is described. The method may include receiving a first sidelink message over a sidelink channel, the first sidelink message including an indication of first resources of the sidelink channel reserved for a second sidelink message, transmitting, to a second UE, a third sidelink message over the sidelink channel, the third sidelink message including an indication of second resources of the sidelink channel, and receiving, from the second UE, a fourth sidelink message over third resources of the sidelink channel based on transmitting the third sidelink message to the second UE, the fourth sidelink message including data for the first UE.

An apparatus for wireless communication at a first UE is described. The apparatus may include a processor, memory in electronic communication with the processor, and instructions stored in the memory. The instructions may be executable by the processor to cause the apparatus to receive a first sidelink message over a sidelink channel, the first sidelink message including an indication of first resources of the sidelink channel reserved for a second sidelink message, transmit, to a second UE, a third sidelink message over the sidelink channel, the third sidelink message including an indication of second resources of the sidelink channel, and receive, from the second UE, a fourth sidelink message over third resources of the sidelink channel based on transmitting the third sidelink message to the second UE, the fourth sidelink message including data for the first UE.

Another apparatus for wireless communication at a first UE is described. The apparatus may include means for receiving a first sidelink message over a sidelink channel, the first sidelink message including an indication of first resources of the sidelink channel reserved for a second sidelink message, means for transmitting, to a second UE, a third sidelink message over the sidelink channel, the third sidelink message including an indication of second resources of the sidelink channel, and means for receiving, from the second UE, a fourth sidelink message over third resources of the sidelink channel based on transmitting the third sidelink message to the second UE, the fourth sidelink message including data for the first UE.

A non-transitory computer-readable medium storing code for wireless communication at a first UE is described. The code may include instructions executable by a processor to receive a first sidelink message over a sidelink channel, the first sidelink message including an indication of first resources of the sidelink channel reserved for a second sidelink message, transmit, to a second UE, a third sidelink message over the sidelink channel, the third sidelink message including an indication of second resources of the sidelink channel, and receive, from the second UE, a fourth sidelink message over third resources of the sidelink channel based on transmitting the third sidelink message to the second UE, the fourth sidelink message including data for the first UE.

Some examples of the method, apparatuses, and non-transitory computer-readable medium described herein may further include operations, features, means, or instructions for receiving a fifth sidelink message from the second UE based on transmitting the third sidelink message to the second UE, where the fifth sidelink message allocates the third resources of the sidelink channel for the fourth sidelink message.

In some examples of the method, apparatuses, and non-transitory computer-readable medium described herein, the second resources of the sidelink channel may be exclusive of the first resources of the sidelink channel and the third resources may be selected from the second resources.

In some examples of the method, apparatuses, and non-transitory computer-readable medium described herein, the fifth sidelink message may be transmitted via a sidelink control channel.

In some examples of the method, apparatuses, and non-transitory computer-readable medium described herein, the second resources of the sidelink channel include the first resources of the sidelink channel and the third resources may be exclusive of the second resources.

Some examples of the method, apparatuses, and non-transitory computer-readable medium described herein may further include operations, features, means, or instructions for determining availability of the first resources for inclusion in the third resources based on comparing a signal metric of the first sidelink message or the second sidelink message to a threshold.

Some examples of the method, apparatuses, and non-transitory computer-readable medium described herein may further include operations, features, means, or instructions for determining the threshold based on a priority of the second sidelink message, a priority of the fourth sidelink message, or a combination thereof.

In some examples of the method, apparatuses, and non-transitory computer-readable medium described herein, the second resources indicate that the first resources may be available for inclusion in the third resources based on the signal metric not satisfying the threshold.

In some examples of the method, apparatuses, and non-transitory computer-readable medium described herein, the second resources indicate that the first resources may be not available for inclusion in the third resources based on the signal metric satisfying the threshold.

In some examples of the method, apparatuses, and non-transitory computer-readable medium described herein, the third sidelink message may be associated with a time window and the second resources indicate available resources for the fourth sidelink message within the time window.

In some examples of the method, apparatuses, and non-transitory computer-readable medium described herein, the first resources include a set of periodic resources and the second resources indicate resources exclusive of each of the set of periodic resources occurring within the time window.

In some examples of the method, apparatuses, and non-transitory computer-readable medium described herein, the first sidelink message includes sidelink control information including the indication of the first resources.

A method for wireless communication at a first UE is described. The method may include receiving, from a second UE, a first sidelink message over a sidelink channel, the first sidelink message including an indication of first resources of the sidelink channel, selecting second resources of the sidelink channel for a second sidelink message to the second UE based on the first resources, transmitting, to the second UE, a third sidelink message over the sidelink channel, where the third sidelink message allocates the second resources for the second sidelink message to the second UE, and transmitting, to the second UE, the second sidelink message over the second resources, where the second sidelink message includes data for the second UE.

An apparatus for wireless communication at a first UE is described. The apparatus may include a processor, memory in electronic communication with the processor, and instructions stored in the memory. The instructions may be executable by the processor to cause the apparatus to receive, from a second UE, a first sidelink message over a sidelink channel, the first sidelink message including an indication of first resources of the sidelink channel, select second resources of the sidelink channel for a second sidelink message to the second UE based on the first resources, transmit, to the second UE, a third sidelink message over the sidelink channel, where the third sidelink message allocates the second resources for the second sidelink message to the second UE, and transmit, to the second UE, the second sidelink message over the second resources, where the second sidelink message includes data for the second UE.

Another apparatus for wireless communication at a first UE is described. The apparatus may include means for receiving, from a second UE, a first sidelink message over a sidelink channel, the first sidelink message including an indication of first resources of the sidelink channel, means for selecting second resources of the sidelink channel for a second sidelink message to the second UE based on the first resources, means for transmitting, to the second UE, a third sidelink message over the sidelink channel, where the third sidelink message allocates the second resources for the second sidelink message to the second UE, and means for transmitting, to the second UE, the second sidelink message over the second resources, where the second sidelink message includes data for the second UE.

A non-transitory computer-readable medium storing code for wireless communication at a first UE is described. The code may include instructions executable by a processor to receive, from a second UE, a first sidelink message over a sidelink channel, the first sidelink message including an indication of first resources of the sidelink channel, select second resources of the sidelink channel for a second sidelink message to the second UE based on the first resources, transmit, to the second UE, a third sidelink message over the sidelink channel, where the third sidelink message allocates the second resources for the second sidelink message to the second UE, and transmit, to the second UE, the second sidelink message over the second resources, where the second sidelink message includes data for the second UE.

In some examples of the method, apparatuses, and non-transitory computer-readable medium described herein, the first resources may be exclusive of third resources which a third UE may have allocated for a fourth sidelink message to a fourth UE and the second resources may be selected from the first resources.

In some examples of the method, apparatuses, and non-transitory computer-readable medium described herein, the first resources include third resources which a third UE may have allocated for a fourth sidelink message to a fourth UE and where the second resources may be exclusive of the first resources.

In some examples of the method, apparatuses, and non-transitory computer-readable medium described herein, the third sidelink message may be transmitted via a sidelink control channel.

A method for wireless communication at a first UE is described. The method may include identifying data for transmission over a sidelink channel, receiving a first sidelink message from a second UE, the first sidelink message including an indication of first resources reserved for a second sidelink message to the second UE, identifying second resources of the sidelink channel based on the first resources, and transmitting a third sidelink message including the identified data over the second resources.

An apparatus for wireless communication at a first UE is described. The apparatus may include a processor, memory in electronic communication with the processor, and instructions stored in the memory. The instructions may be executable by the processor to cause the apparatus to identify data for transmission over a sidelink channel, receive a first sidelink message from a second UE, the first sidelink message including an indication of first resources reserved for a second sidelink message to the second UE, identify second resources of the sidelink channel based on the first resources, and transmit a third sidelink message including the identified data over the second resources.

Another apparatus for wireless communication at a first UE is described. The apparatus may include means for identifying data for transmission over a sidelink channel, means for receiving a first sidelink message from a second UE, the first sidelink message including an indication of first resources reserved for a second sidelink message to the second UE, means for identifying second resources of the sidelink channel based on the first resources, and means for transmitting a third sidelink message including the identified data over the second resources.

A non-transitory computer-readable medium storing code for wireless communication at a first UE is described. The code may include instructions executable by a processor to identify data for transmission over a sidelink channel, receive a first sidelink message from a second UE, the first sidelink message including an indication of first resources reserved for a second sidelink message to the second UE, identify second resources of the sidelink channel based on the first resources, and transmit a third sidelink message including the identified data over the second resources.

In some examples of the method, apparatuses, and non-transitory computer-readable medium described herein, the first sidelink message may be received via a sidelink feedback channel.

Some examples of the method, apparatuses, and non-transitory computer-readable medium described herein may further include operations, features, means, or instructions for monitoring for one or more sidelink messages among a set of UEs, over a beam selected for the transmission of the identified data, the set of UEs including the second UE, where receiving the first sidelink message may be based on the monitoring, where the second UE receives the third message and the fourth UE reserves the second resources.

Some examples of the method, apparatuses, and non-transitory computer-readable medium described herein may further include operations, features, means, or instructions for identifying a sensing window including a set of time and frequency resources associated with the one or more sidelink messages, where the monitoring may be based on the identified sensing window.

Some examples of the method, apparatuses, and non-transitory computer-readable medium described herein may further include operations, features, means, or instructions for identifying a set of reservation parameters associated with the first resources based on the indication of the first resources, where identifying the second resources of the sidelink channel may be based on the identified set of reservation parameters.

Some examples of the method, apparatuses, and non-transitory computer-readable medium described herein may further include operations, features, means, or instructions for identifying reservation information associated with the first resources based on the set of reservation parameters, the identified reservation information including a duration associated with a reservation of the first resources, a periodicity associated with the reservation of the first resources, a quantity of reservations of the first resources, time and frequency information associated with the first resources, or a combination thereof, where identifying the second resources of the sidelink channel may be based on the identified reservation information.

Some examples of the method, apparatuses, and non-transitory computer-readable medium described herein may further include operations, features, means, or instructions for identifying first priority information associated with the second sidelink message based on the indication of the first resources, where identifying the second resources of the sidelink channel may be based on the identified first priority information.

Some examples of the method, apparatuses, and non-transitory computer-readable medium described herein may further include operations, features, means, or instructions for identifying second priority information associated with transmitting the third sidelink message, where identifying the second resources of the sidelink channel may be based on comparing the identified first priority information and the identified second priority information.

Some examples of the method, apparatuses, and non-transitory computer-readable medium described herein may further include operations, features, means, or instructions for measuring a reference signal received power value associated with the first sidelink message, where identifying the second resources of the sidelink channel may be based on the measured reference signal received power value.

Some examples of the method, apparatuses, and non-transitory computer-readable medium described herein may further include operations, features, means, or instructions for determining first priority information associated with the second sidelink message based on the indication of the first resources and determining an interference threshold value associated with the second sidelink message based on the first priority information associated with the second sidelink message and second priority information associated with transmitting the third sidelink message, where identifying the second resources of the sidelink channel may be based on the measured reference signal received power value satisfying the interference threshold value.

In some examples of the method, apparatuses, and non-transitory computer-readable medium described herein, the second sidelink message includes a sidelink data transmission to the second UE.

In some examples of the method, apparatuses, and non-transitory computer-readable medium described herein, the indication of the first resources includes a set of available resources exclusive of the first resources and identifying the second resources includes identifying the second resources from among the set of available resources.

Some examples of the method, apparatuses, and non-transitory computer-readable medium described herein may further include operations, features, means, or instructions for identifying the second resources includes identifying the second resources exclusive of the first resources.

In some examples of the method, apparatuses, and non-transitory computer-readable medium described herein, the first sidelink message may be received via a sidelink control channel, a sidelink data channel, or both.

Some examples of the method, apparatuses, and non-transitory computer-readable medium described herein may further include operations, features, means, or instructions for identifying a set of resource parameters associated with the first resources based on the indication of the first resources, where identifying the second resources of the sidelink channel may be based on the identified set of resource parameters.

Some examples of the method, apparatuses, and non-transitory computer-readable medium described herein may further include operations, features, means, or instructions for identifying resource information associated with the first resources based on the identified set of resource parameters, the identified resource information including a periodicity associated with the first resources, time and frequency information associated with the first resources, priority information associated with the second sidelink message, or a combination thereof, where identifying the second resources of the sidelink channel may be based on the identified resource information.

Some examples of the method, apparatuses, and non-transitory computer-readable medium described herein may further include operations, features, means, or instructions for identifying a transmit power value associated with the first sidelink message based on the first sidelink message, where identifying the second resources of the sidelink channel may be based on the identified transmit power value.

Some examples of the method, apparatuses, and non-transitory computer-readable medium described herein may further include operations, features, means, or instructions for determining first priority information associated with the second sidelink message based on the indication of the first resources and determining an interference threshold value associated with the second sidelink message based on the first priority information associated with the second sidelink message and second priority information associated with transmitting the third sidelink message, where identifying the second resources of the sidelink channel may be based on the transmit power value satisfying the interference threshold value.

In some examples of the method, apparatuses, and non-transitory computer-readable medium described herein, the first resources included in the indication may be reserved by a third UE and the third sidelink message including the identified data may be transmitted to a fourth UE.

In some examples of the method, apparatuses, and non-transitory computer-readable medium described herein, the first resources included in the indication may be reserved by a third UE.

A method for wireless communication at a first UE is described. The method may include receiving a first sidelink message including an indication of first resources reserved for a second sidelink message to the first UE, receiving the second sidelink message over the first resources, the second sidelink message including data, and transmitting a third sidelink message to a second UE based on the first sidelink message, the third sidelink message including the indication of the first resources reserved for the second sidelink message.

An apparatus for wireless communication at a first UE is described. The apparatus may include a processor, memory in electronic communication with the processor, and instructions stored in the memory. The instructions may be executable by the processor to cause the apparatus to receive a first sidelink message including an indication of first resources reserved for a second sidelink message to the first UE, receive the second sidelink message over the first resources, the second sidelink message including data, and transmit a third sidelink message to a second UE based on the first sidelink message, the third sidelink message including the indication of the first resources reserved for the second sidelink message.

Another apparatus for wireless communication at a first UE is described. The apparatus may include means for receiving a first sidelink message including an indication of first resources reserved for a second sidelink message to the first UE, means for receiving the second sidelink message over the first resources, the second sidelink message including data, and means for transmitting a third sidelink message to a second UE based on the first sidelink message, the third sidelink message including the indication of the first resources reserved for the second sidelink message.

A non-transitory computer-readable medium storing code for wireless communication at a first UE is described. The code may include instructions executable by a processor to receive a first sidelink message including an indication of first resources reserved for a second sidelink message to the first UE, receive the second sidelink message over the first resources, the second sidelink message including data, and transmit a third sidelink message to a second UE based on the first sidelink message, the third sidelink message including the indication of the first resources reserved for the second sidelink message.

In some examples of the method, apparatuses, and non-transitory computer-readable medium described herein, the third sidelink message may be transmitted via a sidelink feedback channel.

Some examples of the method, apparatuses, and non-transitory computer-readable medium described herein may further include operations, features, means, or instructions for identifying priority information associated with receiving the second sidelink message based on the first sidelink message and setting, based on the identified priority information, an interference threshold value associated with receiving one or more sidelink messages, the one or more sidelink messages including the second sidelink message.

Some examples of the method, apparatuses, and non-transitory computer-readable medium described herein may further include operations, features, means, or instructions for identifying priority information associated with receiving the second sidelink message based on the first sidelink message and setting, based on the identified priority information, a transmit power value associated with transmitting the third sidelink message, where transmitting the third sidelink message may be based on the transmit power value.

In some examples of the method, apparatuses, and non-transitory computer-readable medium described herein, the first sidelink message may be transmitted via a sidelink control channel.

In some examples of the method, apparatuses, and non-transitory computer-readable medium described herein, the third sidelink message may be transmitted via a sidelink control channel, a sidelink data channel, or both.

Some examples of the method, apparatuses, and non-transitory computer-readable medium described herein may further include operations, features, means, or instructions for identifying priority information associated with receiving the second sidelink message based on the first sidelink message and setting, based on the identified priority information, a transmit power value associated with transmitting the third sidelink message, where the third sidelink message includes an indication of the transmit power value.

Some examples of the method, apparatuses, and non-transitory computer-readable medium described herein may further include operations, features, means, or instructions for identifying priority information associated with receiving the second sidelink message based on the first sidelink message and setting, based on the identified priority information, an interference threshold value associated with receiving one or more sidelink messages, the one or more sidelink messages including the second sidelink message, where the third sidelink message includes an indication of the interference threshold value.

DETAILED DESCRIPTION

Figure 1:
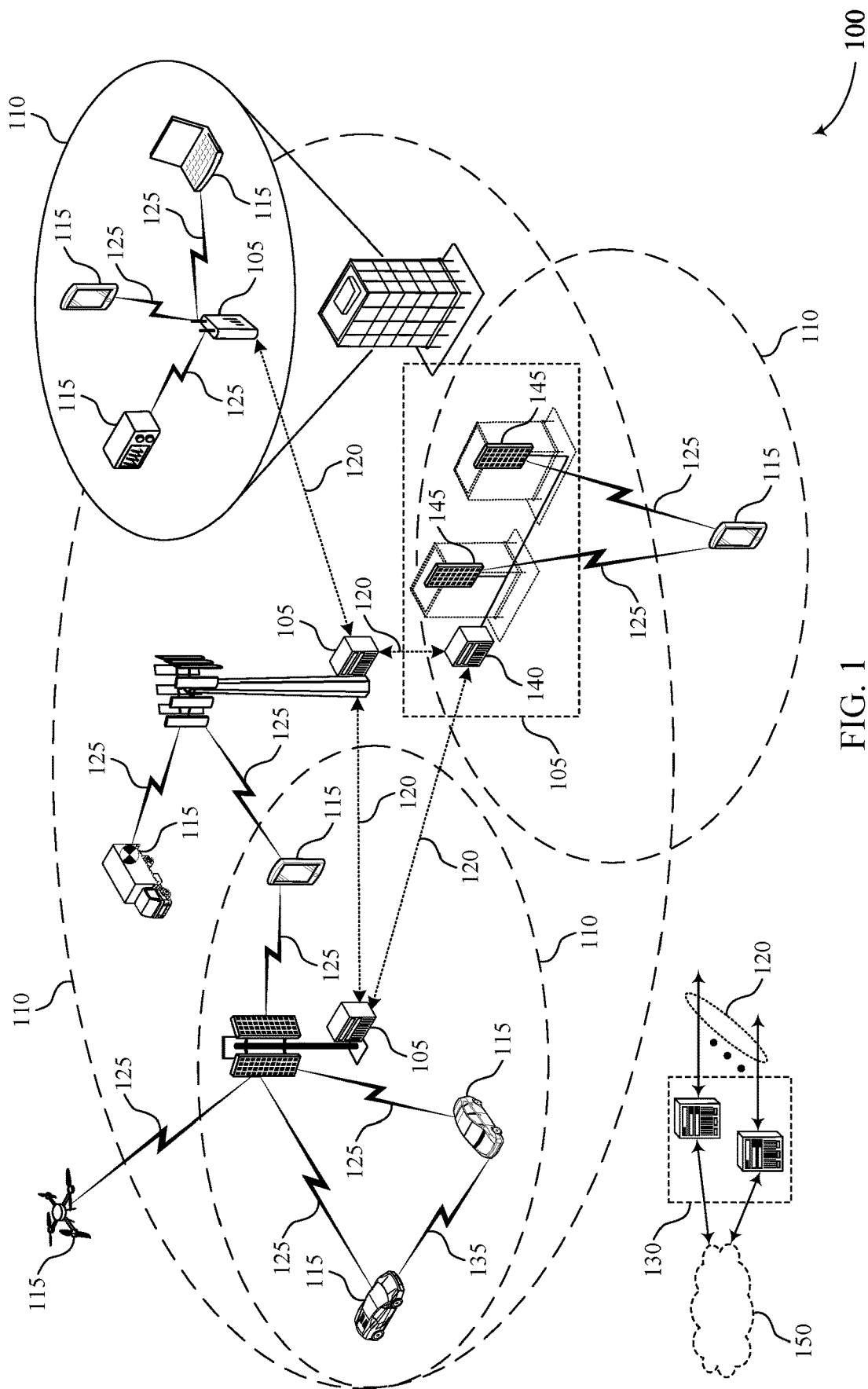
FIG. 1 illustrates an example of a wireless communications system that supports resource selection with sidelink receiver sensing and sidelink transmitter sensing in accordance with aspects of the present disclosure.

In some systems, user equipment (UEs) may use beamforming techniques to perform sidelink communications over available time and frequency resources of a sidelink channel. In some cases, prior to a UE (also referred to herein as a first UE) transmitting a sidelink data transmission to another UE (also referred to herein as a second UE), the first UE may identify whether resources are available for the sidelink data transmission. For example, the first UE may identify and avoid transmitting over resources which are already in use, or reserved, by other UEs.

In some systems, the first UE may sense or monitor for control information (e.g., sidelink control indicators) transmitted by other UEs, for example, using transmit-side sensing techniques. In an example, during a "sensing window" or sensing duration, the first UE may sense or monitor for control information (e.g., sidelink control indicators) transmitted from other UEs, using a transmit beam of the first UE. For example, based on the sensing or monitoring, the first UE may receive control information (e.g., sidelink control indicators) transmitted between other UEs (e.g., control information transmitted from a fourth UE to a third UE), The control information (e.g., sidelink control indicators) may indicate resources that are in use or reserved by the other UEs for sidelink communications. In some cases, the control information (e.g., sidelink control indicators) may include priority information associated with a transmission, a resource reservation interval, or a quantity of reservations. Based on control information (e.g., sidelink control indicators) the first UE receives during the sensing window, the first UE may identify resources which are unavailable for use within a "resource selection window" or resource selection duration. In some examples, the first UE may determine or select resources within the "resource selection window" over which the first UE may transmit a sidelink transmission to another UE (e.g., a second UE). A sidelink transmission may also be referred to herein as a sidelink message.

However, in some cases, due to positioning of the UEs or physical obstacles located between UEs, the first UE may be unable to successfully detect or receive control information from other UEs sharing the sidelink channel. For example, the first UE may be unable to detect or receive control information transmitted by UEs located in directions away from the direction of transmit beam of the first UE. In some cases, in the millimeter wave (mmW) bands such as 'FR2,' beams may be relatively narrow and more susceptible to being blocked by physical obstacles, and thus improved techniques for detecting (receiving) control information communicated between other UEs are desired.

Accordingly, when a first UE is unable to detect (receive) control information transmitted by another UE (e.g., from a fourth UE to a third UE), the first UE may fail to identify resources reserved for sidelink transmissions from the fourth UE to the third UE. The first UE may mistakenly determine that the sidelink channel is free. In some cases, the first UE may transmit a sidelink transmission to the second UE over the same resources reserved for the sidelink transmissions from the fourth UE to the third UE, resulting in interference between the two sidelink transmissions. Improved techniques for mitigating interference between sidelink transmissions are desired.

According to examples of aspects described herein, a first UE may identify data for transmission to a second UE over a sidelink channel. The first UE may monitor for sidelink messages among multiple UEs (e.g., the second UE, a third UE, and a fourth UE). In some aspects, the first UE may monitor for sidelink messages over a transmit beam selected for transmitting the identified data to the second UE. The first UE may monitor for sidelink messages associated with a sensing window. The sensing window may include time and frequency resources associated with transmitting or receiving sidelink messages. For example, the time and frequency resources may be reserved for sidelink communications between sidelink enabled UEs.

In some aspects, the first UE may receive a sidelink message from the third UE. The sidelink message may include an indication of reserved resources (e.g., resources reserved by the fourth UE for transmitting a sidelink message to the third UE). In some aspects, the sidelink message may indicate available resources different from (e.g., exclusive of) the reserved resources. The first UE may select, from among the available resources, resources over which the first UE may transmit the identified data (e.g., a sidelink message including the data) to the second UE.

In some examples, the first UE may receive the sidelink message from the third UE via a sidelink feedback channel. For example, the sidelink message from the third UE may be a sidelink feedback channel transmission, such as a physical sidelink feedback channel (PSFCH) transmission. In another example, the first UE may receive the sidelink message from the third UE via a sidelink control channel. For example, the sidelink message from the third UE may be a sidelink control channel message including sidelink control information. In some other examples, the first UE may receive the sidelink message from the third UE via a sidelink data channel. For example, the sidelink message from the third UE may be a sidelink data channel transmission, such as a physical sidelink shared channel (PSSCH) transmission. Examples of aspects of the information included in the sidelink feedback channel transmission, the sidelink control information, and the sidelink data channel transmission are described herein.

Additionally, or alternatively, the second UE may receive a first sidelink message (e.g., sidelink control information (SCI)) from the fourth UE, where the first sidelink message includes an indication of first resources reserved by the fourth UE for a second sidelink messages (e.g., a PSSCH transmission) by the fourth UE to the third UE. The second UE may transmit, to the first UE, a third sidelink message that includes an indication of second resources of the sidelink channel. The first UE may transmit, to the second UE, a fourth sidelink message (e.g., a PSSCH transmission) over third resources of the sidelink channel based on receiving the third sidelink message from the second UE. The third resources may be selected from the second resources indicated by the second UE if the second resources are exclusive of the first resources indicated by the fourth UE. Additionally, or alternatively, the third resources may be exclusive of the second resources indicated by the second UE if the second resources include the first resources indicated by the fourth UE. In some examples, the first UE may transmit a fifth sidelink message (e.g., SCI) to the second UE that allocates the third resources of the sidelink channel for the fourth sidelink message.

Aspects of the subject matter described herein may be implemented to realize one or more advantages. The described techniques may support improvements in spectral efficiency and reliability, among other advantages. According to examples of aspects described herein, a first UE may identify resource reservations associated with multiple UEs (e.g., a fourth UE), even for cases in which the first UE is unable to directly receive information indicative of the resource reservations for some of the UEs (e.g., the fourth UE) due to conditions such as signal blockage. For instance, the first UE may receive an indication of resources from a second UE to which the first UE is to transmit or from a third UE to which the fourth UE is to transmit. Accordingly, the first UE may transmit sidelink transmissions over available (non-reserved) resources, rather than transmitting over resources already reserved for other sidelink transmissions. By transmitting sidelink transmissions over non-conflicting resources, interference among sidelink transmissions may be effectively mitigated, thereby improving spectral efficiency and reducing the potential number of retransmissions. Further, the resource reservations may be indicated to the first UE via different signaling types (e.g., PSFCH transmissions, sidelink control information, PSSCH transmissions), which may provide design flexibility with respect to signaling.

Aspects of the disclosure are initially described in the context of wireless communications systems. Additional aspects of the disclosure are described in the context of a timing diagram and process flows. Aspects of the disclosure are further illustrated by and described with reference to apparatus diagrams, system diagrams, and flowcharts that relate to resource selection with sidelink receiver sensing.

FIG. 1 illustrates an example of a wireless communications system 100 that supports resource selection with sidelink receiver sensing and sidelink transmitter sensing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to examples of aspects described herein, a first UE 115 may identify data for transmission to a second UE 115 over a sidelink channel. The first UE 115 may monitor for sidelink messages among multiple UEs 115 (e.g., the second UE 115, a third UE 115, and a fourth UE 115). In some aspects, the first UE 115 may monitor for sidelink messages over a transmit beam selected for transmitting the identified data to the second UE 115. The first UE 115 may monitor for sidelink messages during a sensing window. The sensing window may include time and frequency resources associated with transmitting or receiving sidelink messages. For example, the time and frequency resources may be reserved (e.g., based on a time of reservation or priority) for sidelink communications between sidelink enabled UEs 115.

In some aspects, the first UE 115 may receive a sidelink message from the third UE 115. The sidelink message may include an indication of reserved resources (e.g., resources reserved by the fourth UE 115 for transmitting a sidelink message to the third UE 115). In some aspects, the sidelink message may indicate available resources different from (e.g., exclusive of) the reserved resources. The first UE 115 may select, from among the available resources, resources over which the first UE 115 may transmit the identified data (e.g., a sidelink message including the data) to the second UE 115.

In some examples, the first UE 115 may receive the sidelink message from the third UE 115 via a sidelink feedback channel. For example, the sidelink message from the third UE 115 may be a sidelink feedback channel transmission, such as a PSFCH transmission. In another example, the first UE 115 may receive the sidelink message from the third UE 115 via a sidelink control channel. For example, the sidelink message from the third UE 115 may be a sidelink control channel message including sidelink control information. In some other examples, the first UE 115 may receive the sidelink message from the third UE 115 via a sidelink data channel. For example, the sidelink message from the third UE 115 may be a sidelink data channel transmission, such as a PSSCH transmission. Examples of aspects of the information included in the sidelink feedback channel transmission, the sidelink control information, and the sidelink data channel transmission are described herein.

Additionally, or alternatively, the second UE 115 may receive a first sidelink message (e.g., sidelink control information (SCI)) from the fourth UE 115, where the first sidelink message includes an indication of first resources reserved by the fourth UE 115 for a second sidelink messages (e.g., a PSSCH transmission) by the fourth UE 115 to the third UE 115. The second UE 115 may transmit, to the first UE 115, a third sidelink message that includes an indication of second resources of the sidelink channel. The first UE 115 may transmit, to the second UE 115, a fourth sidelink message (e.g., a PSSCH transmission) over third resources of the sidelink channel based on receiving the third sidelink message from the second UE 115. The third resources may be selected from the second resources indicated by the second UE 115 if the second resources are exclusive of the first resources indicated by the fourth UE 115. Additionally, or alternatively, the third resources may be exclusive of the second resources indicated by the second UE 115 if the second resources include the first resources indicated by the fourth UE 115. In some examples, the first UE 115 may transmit a fifth sidelink message (e.g., SCI) to the second UE 115 that allocates the third resources of the sidelink channel for the fourth sidelink message.

Figure 2:
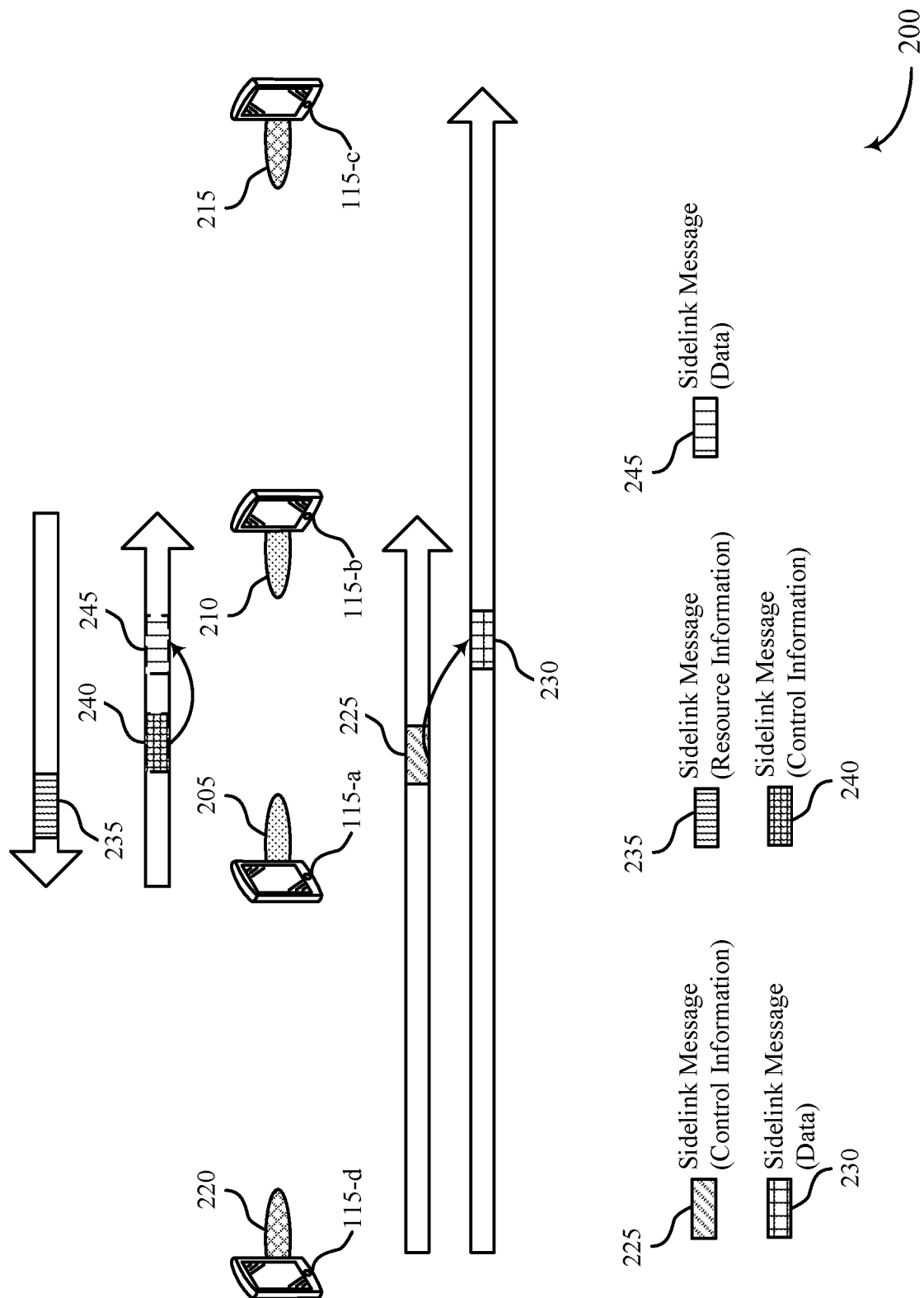
FIG. 2 illustrates an example of a wireless communications system that supports resource selection with sidelink receiver sensing in accordance with aspects of the present disclosure.

FIG. 2 illustrates an example of a wireless communications system 200 that supports resource selection with sidelink receiver sensing in accordance with aspects of the present disclosure. Wireless communications system 200 may implement aspects of wireless communications system 100 and may include UE 115 a through UE 115-d, which may be examples of a UE 115 described with reference to FIG. 1.

Wireless communications system 200 may include UE 115-a through UE 115-d, which may be examples of a UE 115 described with reference to FIG. 1. UE 115-a through UE 115-d may be examples of UE 115-e through UE 115-h described with reference to FIG. 3.

According to examples of aspects described herein, the UE 115-b may monitor for sidelink messages among multiple UEs 115 (e.g., UE 115-a, UE 115-c, and UE 115-d, among others). In some aspects, the UE 115-b may monitor for sidelink messages over a receive beam 210 selected for receiving data from UE 115-a. The UE 115-a may transmit the data over a transmit beam 205. The UE 115-b may monitor for sidelink control information (e.g., sidelink control messages from other UEs 115, such as UE 115-d) during a sensing window. The sensing window may include time and frequency resources associated with transmitting or receiving control information. For example, the time and frequency resources may be reserved for sidelink communications between sidelink enabled UEs 115 that include control information (e.g., SCI). Examples of aspects of a sensing window are described herein with reference to FIG. 4. In some examples, at least a portion of a resource selection window (e.g., a window for a UE 115 to select resources) may be used by UE 115-b as a sensing window. For example, UE 115-b may be allocated periodic resources for transmitting a sidelink message indicating resources reserved for sidelink communications, and each allocated periodic resource may have a sensing window prior to the resource and a resource selection window subsequent to the resource.

In some aspects, the UE 115-b may receive a sidelink message 225 from the UE 115-d. In some examples, the UE 115-b may receive the sidelink message 225 over the receive beam 210. The sidelink message 225 may include an indication of reserved resources in the sidelink channel. In an example, the sidelink message 225 may include an indication of resources reserved by the UE 115-d for transmitting a sidelink message 230 (e.g., a PSSCH message, PSSCH transmission) to the UE 115-c. In some examples, the UE 115-b may receive the sidelink message 225 from the UE 115-d via a sidelink control channel (e.g., the sidelink message 225 may be included in SCI).

In some aspects, through receiving the sidelink message 225 (e.g., SCI) from the UE 115-d, the UE 115-b may identify resources reserved for communications (e.g., sidelink transmissions) by the UE 115-d. The resources reserved for communications by the UE 115-d may include a single set of resources for one transmission or a set of periodic resources. Based on identifying the reserved resources, the UE 115-b may transmit a sidelink message 235 to the UE 115-a that indicates the reserved resources (e.g., the UE 115-b may indicate resources that include the reserved resources) or available resources exclusive of the reserved resources (e.g., the UE 115-*b* may indicate resources that do not overlap the reserved resources in time, frequency, or both). In some examples, sidelink message 235 may be associated with a time window and the available resources indicated by the sidelink message 235 may be within the time window. Additionally, if any resources reserved by the UE 115-*d* occur within the time window, the available resources may be exclusive of the resources reserved by the UE 115-*d*. For instance, if the resources reserved by the UE 115-*d* are periodic and one or more periodic resources reserved the UE 115-*d* are within the time window, the available resources indicated by the sidelink message 235 may be exclusive of the one or more periodic resources within the time window.

UE 115-*a* may use the indicated resources to select resources over which to transmit a sidelink message 245 (e.g., a PSSCH message, PSSCH transmission). The resources that UE 115-*a* selects may be exclusive of (e.g., may not overlap) the resources reserved by the UE 115-*d*. For instance, if the sidelink message 235 from the UE 115-*b* indicates the reserved resources, the UE 115-*a* may select resources for transmitting sidelink message 245 that are exclusive of the indicated reserved resources. Additionally, or alternatively, if the sidelink message 235 from the UE 115-*b* indicates available resources, the UE 115-*a* may select resources for transmitting sidelink message 245 from the available resources.

In some examples, the UE 115-*a* may transmit a sidelink message 240 to UE 115-*b* that allocates the resources selected by the UE 115-*a* for transmission of the sidelink message 245 (e.g., sidelink message 240 may include a sidelink grant for the sidelink message 245). In some examples, the sidelink message 240 may be transmitted in SCI over a sidelink control channel (e.g., a physical sidelink control channel (PSCCH)). Examples of aspects of resource identification and resource selection based on the sidelink message 225 (e.g., SCI) and/or the sidelink message 235 are described herein with reference to FIG. 4.

Aspects of the subject matter described herein may be implemented to realize one or more advantages. The described techniques may support improvements in spectral efficiency and reliability, among other advantages. For instance, due to the UE 115-*a* transmitting sidelink message 245 over available (e.g., non-reserved) resources exclusive of the resources reserved by the UE 115-*d*, the UE 115-*a* may prevent or mitigate the sidelink message 245 from interfering with the sidelink message 230. As such, UEs 115-*b* and/or 115-*c* may be more likely to receive and successfully decode sidelink message 245 and/or sidelink message 230, respectively.

Figure 3:
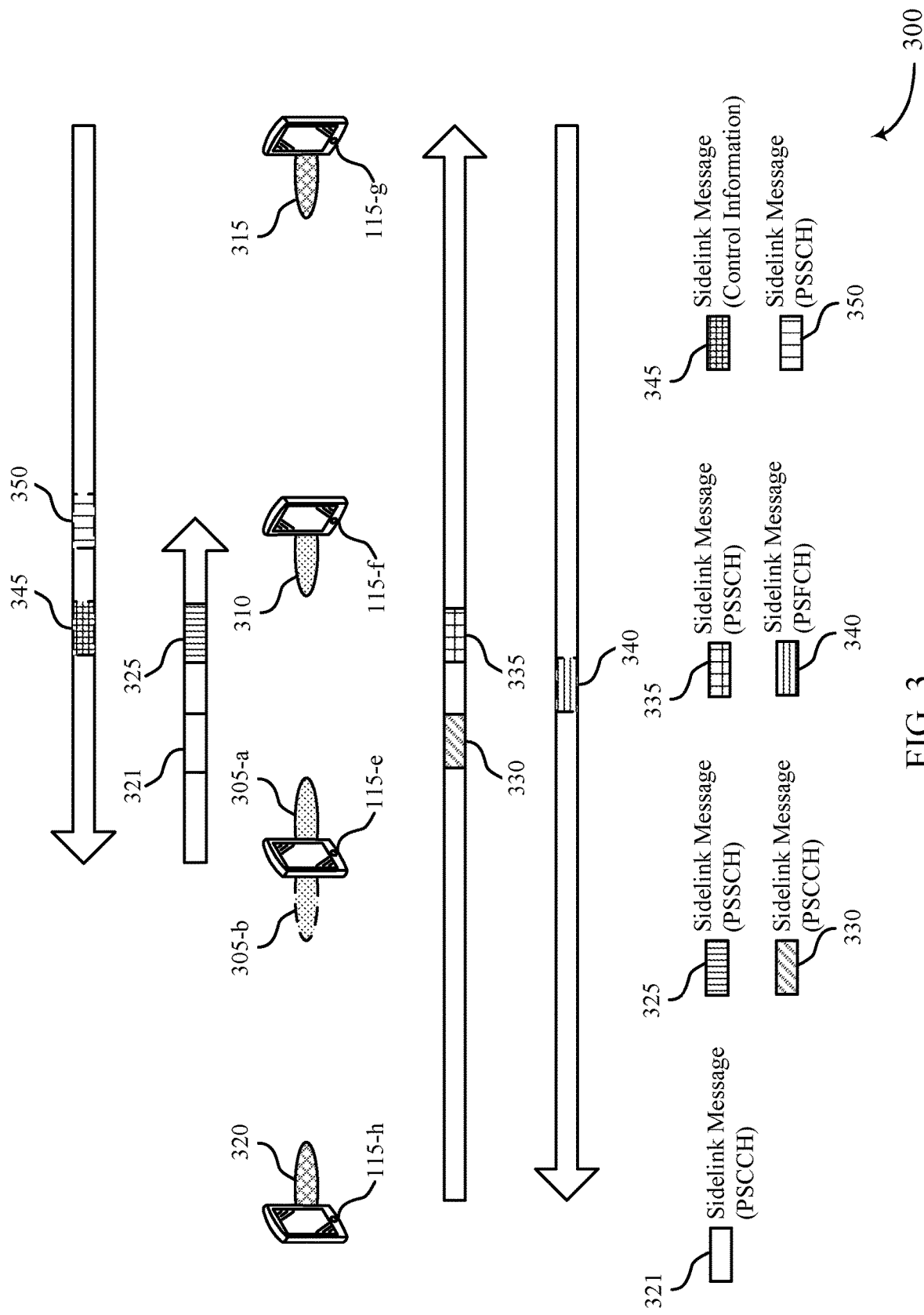
FIG. 3 illustrates an example of a wireless communications system that supports resource selection with sidelink transmitter sensing in accordance with aspects of the present disclosure.

FIG. 3 illustrates an example of a wireless communications system 300 that supports resource selection with sidelink transmitter sensing in accordance with aspects of the present disclosure. Wireless communications system 300 may implement aspects of wireless communications system 100 and wireless communications system 200. Wireless communications system 300 may include UE 115-*e* through UE 115-*h*, which may be examples of a UE 115 described with reference to FIG. 1. UE 115-*e* through UE 115-*h* may be examples of UE 115-*a* through UE 115-*d* described with reference to FIG. 2.

According to examples of aspects described herein, the UE 115-*e* may identify data for transmission to a UE 115-*f* over a sidelink channel. The UE 115-*e* may monitor for sidelink messages among multiple UEs 115 (e.g., UE 115-*f*, UE 115-*g*, and UE 115-*h*, among others). In some aspects, the UE 115-*e* may monitor for control information (e.g., control messages from other UEs 115, such as UE 115-*g*) over a transmit beam 305-*a* selected for transmitting the identified data to the UE 115-*f*. The UE 115-*e* may monitor for sidelink messages that include control information (e.g., SCI) during a sensing window. In some aspects, the UE 115-*e* may monitor each potential control resource for sidelink messages that include control information (e.g., SCI).

The sensing window may include time and frequency resources associated with transmitting or receiving sidelink messages. For example, the time and frequency resources may be reserved for sidelink communications between sidelink enabled UEs 115. Examples of aspects of the sensing window are described herein with reference to FIG. 4. In some examples, at least a portion of a resource selection window 415 (e.g., a window for a UE 115 to select resources) may be used by UE 115-*e* as a sensing window 405 (e.g., as a sensing window prior to a second resource selection window). Additionally, or alternatively, a sensing window 405 may be at least a portion of a previous resource selection window 415.

In some aspects, the UE 115-*e* may receive a sidelink message 340 from the UE 115-*g*. In some examples, the UE 115-*e* may receive the sidelink message 340 over the transmit beam 305-*a*. The sidelink message 340 may include an indication of reserved resources in the sidelink channel. In an example, the sidelink message 340 may include an indication of resources reserved by the UE 115-*h* for transmitting a sidelink message 335 (e.g., a PSSCH message, PSSCH transmission) to the UE 115-*g*. In some examples, the UE 115-*e* may receive the sidelink message 340 from the UE 115-*g* via a sidelink feedback channel. For example, the sidelink message 340 received from the UE 115-*g* may be a sidelink feedback channel transmission, such as a PSFCH message or PSFCH transmission.

In some aspects, through receiving the sidelink message 340 (e.g., PSFCH message, PSFCH transmission) from the UE 115-*g*, the UE 115-*e* may identify resources reserved for communications (e.g., sidelink transmissions) by the UE 115-*h*. Based on identifying the reserved resources, the UE 115-*e* may transmit sidelink transmissions over resources exclusive of (e.g., that do not overlap) the resources reserved by the UE 115-*h*, which may mitigate potential interference between sidelink transmissions of the UE 115-*e* (e.g., sidelink transmissions to the UE 115-*f*) and sidelink transmissions of the UE 115-*h* (e.g., sidelink transmissions to the UE 115-*g*). For example, interference between sidelink transmissions of the UE 115-*e* and sidelink transmissions received by the UE 115-*g* (e.g., due to factors such as channel reciprocity) may be mitigated or eliminated using aspects of the example techniques described herein.

In an example, the UE 115-*h* may transmit a sidelink message 330 (e.g., sidelink control information, a sidelink control indicator) over a beam 320, and the UE 115-*g* may receive the sidelink message 330 over a beam 315. The sidelink message 330 may be transmitted over a sidelink control channel (e.g., PSCCH). The sidelink message 330 (e.g., sidelink control information, a sidelink control indicator) may include an indication of the resources reserved by the UE 115-*h* for transmitting the sidelink message 335 (e.g., a PSSCH message, PSSCH transmission) to the UE 115-*g*. The UE 115-*h* may transmit (and the UE 115-*g* may receive) the sidelink message 335 (e.g., a PSSCH message, PSSCH transmission) based on the indication of the reserved resources.

The UE 115-g may transmit the sidelink message 340 (e.g., PSFCH message, PSFCH transmission) to the UE 115-h based on the sidelink message 330 (e.g., sidelink control information, a sidelink control indicator) or the sidelink message 335 (e.g., PSSCH message, PSSCH transmission). In an example, the UE 115-g may transmit the sidelink message 340 (e.g., PSFCH message, PSFCH transmission) over the beam 315 or over a different beam. The sidelink message 340 (e.g., PSFCH message, PSFCH transmission) may include hybrid automatic repeat request (HARQ) feedback associated with the sidelink message 335 (e.g., PSSCH message, PSSCH transmission). In some aspects, the sidelink message 340 (e.g., PSFCH message, PSFCH transmission) may include an indication of resources that have previously been reserved (e.g., currently reserved resources) by another UE 115 (e.g., UE 115-h). In some other aspects, the sidelink message 340 (e.g., PSFCH message, PSFCH transmission) may include an indication of resources reserved by the UE 115-h for transmitting future sidelink messages, such as a future sidelink message 335 (e.g., PSSCH message, PSSCH transmission), to the UE 115-g.

In an example, based on the sidelink message 340 (e.g., PSFCH message, PSFCH transmission) received from the UE 115-g, the UE 115-e may successfully identify resources reserved for communications (e.g., sidelink transmissions) by the UE 115-h. In some examples, based on identifying the reserved resources, the UE 115-e may identify available resources of the sidelink channel over which to transmit a sidelink message 325 (e.g., PSSCH message, PSSCH transmission). In some aspects, the UE 115-e may receive multiple PSFCH messages from different UEs 115, and the UE 115-e may identify and select from available resources that do not overlap any reserved resources indicated in the PSFCH messages. In some other aspects, the UE 115-e may suspend or delay transmitting sidelink messages, for example, sidelink message 325 (e.g., PSSCH message, PSSCH transmission), under conditions in which the UE 115-e determines that limited resources (e.g., below a threshold number of resources) or no resources are available for a given time period (e.g., slot).

In an example, the UE 115-e may transmit a sidelink message 321 (e.g., sidelink control information, a sidelink control indicator) over the beam 305-a, and the UE 115-f may receive the sidelink message 321 over a receive beam 310. The sidelink message 321 may be transmitted over a sidelink control channel (e.g., PSCCH). The sidelink message 321 (e.g., sidelink control information, a sidelink control indicator) may include an indication of the resources reserved by the UE 115-e for transmitting the sidelink message 325 (e.g., PSSCH message, PSSCH transmission) to the UE 115-f. The UE 115-e may transmit the sidelink message 325 (e.g., PSSCH message, PSSCH transmission) over the beam 305-a based on the indication of the reserved resources. The UE 115-f may receive the sidelink message 325 (e.g., PSSCH message, PSSCH transmission) via the receive beam 310 based on the indication of the reserved resources. Accordingly, the techniques described herein may be advantageous over some systems.

In some aspects, the UE 115-e may monitor for sidelink messages over the beam 305-a and refrain from monitoring for sidelink messages over a beam 305-b. that may be pointed in a direction that is different from (e.g., pointed in an opposite direction from) beam 305-a. In some other aspects, the UE 115-e may monitor for sidelink messages over both the beam 305-a and the beam 305-b. For example, the UE 115-e may monitor for control information (e.g., sidelink control information, sidelink control indicators) over the beam 305-b and monitor for sidelink feedback information (e.g., PSFCH messages, PSFCH transmissions) over the beam 305-a. In some other examples, the UE 115-e may monitor for both control information (e.g., sidelink control information, sidelink control indicators) and sidelink feedback information (e.g., PSFCH messages, PSFCH transmissions) over each of the beam 305-a and the beam 305-b.

Figure 4:
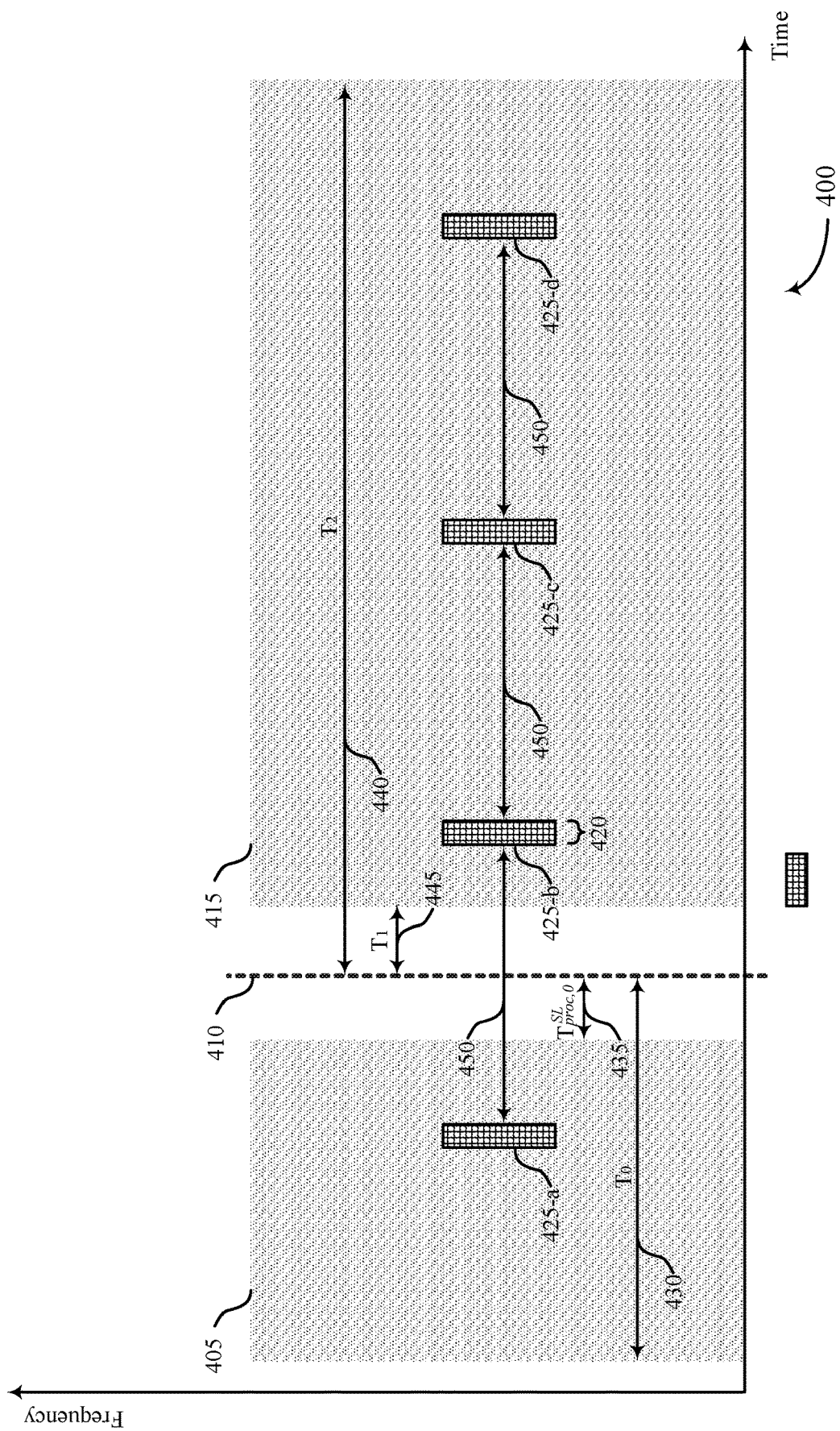
FIG. 4 illustrates an example of a timing diagram that supports resource selection with sidelink receiver sensing and sidelink transmitter sensing in accordance with aspects of the present disclosure.

Examples of aspects of monitoring for sidelink feedback information (e.g., PSFCH messages, PSFCH transmissions), identifying resources reserved for communications (e.g., sidelink transmissions), and identifying available resources of the sidelink channel over which to transmit a sidelink message (e.g., PSSCH message, PSSCH transmission) are described herein with reference to FIG. 4.

In another example aspect, the UE 115-e may receive a sidelink message 345 (e.g., sidelink control information, a sidelink control indicator) from the UE 115-g. In some examples, the UE 115-e may receive the sidelink message 345 (e.g., sidelink control information, a sidelink control indicator) over the transmit beam 305-a. The sidelink message 345 (e.g., sidelink control information, a sidelink control indicator) may include an indication of reserved resources in the sidelink channel. In an example, the sidelink message 345 (e.g., sidelink control information, a sidelink control indicator) may include an indication of the resources reserved by the UE 115-h for transmitting the sidelink message 335 (e.g., a PSSCH message, PSSCH transmission) to the UE 115-g. In some examples, the UE 115-e may receive the sidelink message 345 (e.g., sidelink control information, a sidelink control indicator) from the UE 115-g via a sidelink control channel (e.g., PSCCH). For example, the sidelink message 345 (e.g., sidelink control information, a sidelink control indicator) received from the UE 115-g may be a sidelink control channel transmission.

In some aspects, through receiving the sidelink message 345 (e.g., sidelink control information, a sidelink control indicator) from the UE 115-g, the UE 115-e may identify resources reserved for communications (e.g., sidelink transmissions) by the UE 115-h. Based on identifying the reserved resources, the UE 115-e may transmit sidelink transmissions over resources exclusive of (e.g., that do not overlap) the resources reserved by the UE 115-h. In some examples, such techniques may mitigate potential interference between sidelink transmissions of the UE 115-e and sidelink transmissions of the UE 115-h (e.g., sidelink transmissions received by the UE 115-g).

In an example, the UE 115-g may transmit the sidelink message 345 (e.g., sidelink control information, a sidelink control indicator) to the UE 115-e based on the sidelink message 330 (e.g., sidelink control information, a sidelink control indicator) or the sidelink message 335 (e.g., PSSCH message, PSSCH transmission) from the UE 115-g. For example, the UE 115-g may transmit the sidelink message 345 (e.g., sidelink control information, a sidelink control indicator) based on resource reservation information in the sidelink message 330 (e.g., sidelink control information, a sidelink control indicator). In another example, the UE 115-g may transmit the sidelink message 345 (e.g., sidelink control information, a sidelink control indicator) based on successful or unsuccessful reception of the sidelink message 335 (e.g., PSSCH message, PSSCH transmission) from the UE 115-g. For example, based on receiving the sidelink message 335 (e.g., PSSCH message, PSSCH transmission), the UE 115-g may transmit, in the sidelink message 345 (e.g., sidelink control information, a sidelink control indicator), an indication of time and frequency resources associated with the sidelink message 335 (e.g., PSSCH message, PSSCH transmission).

In another example aspect, the UE 115-e may receive a sidelink message 350 (e.g., PSSCH message, PSSCH transmission) from the UE 115-g. In some examples, the UE 115-e may receive the sidelink message 350 (e.g., PSSCH message, PSSCH transmission) over the transmit beam 305-a. The sidelink message 350 (e.g., PSSCH message, PSSCH transmission) may include an indication of reserved resources in the sidelink channel. In an example, the sidelink message 350 (e.g., PSSCH message, PSSCH transmission) may include an indication of the resources reserved by the UE 115-h for transmitting the sidelink message 335 (e.g., a PSSCH message, PSSCH transmission) to the UE 115-g. In some examples, the UE 115-e may receive the sidelink message 350 (e.g., PSSCH message, PSSCH transmission) from the UE 115-g via a sidelink data channel. For example, the sidelink message 350 (e.g., PSSCH message, PSSCH transmission) received from the UE 115-g may be a sidelink data channel transmission.

In some aspects, through receiving the sidelink message 350 (e.g., PSSCH message, PSSCH transmission) from the UE 115-g, the UE 115-e may identify resources reserved for communications (e.g., sidelink transmissions) by the UE 115-h. Based on identifying the reserved resources, the UE 115-e may transmit sidelink transmissions over resources exclusive of (e.g., that do not overlap) the resources reserved by the UE 115-h. In some examples, such techniques may mitigate potential interference between sidelink transmissions of the UE 115-e and sidelink transmissions of the UE 115-h (e.g., sidelink transmissions received by the UE 115-g).

In an example, the UE 115-g may transmit the sidelink message 350 (e.g., PSSCH message, PSSCH transmission) based on receiving the sidelink message 330 (e.g., sidelink control information, a sidelink control indicator) from the UE 115-h. In some aspects, the UE 115-g may broadcast the sidelink message 350 (e.g., PSSCH message, PSSCH transmission) over the sidelink channel. For example, the sidelink message 350 (e.g., PSSCH message, PSSCH transmission) may be or include broadcast information that may be received by some or all of the UEs 115 (e.g., UE 115-e, UE 115-f, UE 115-h) over the sidelink channel.

For example, the UE 115-g may transmit the sidelink message 350 (e.g., PSSCH message, PSSCH transmission) based on resource reservation information in the sidelink message 330 (e.g., sidelink control information, a sidelink control indicator). In another example, the UE 115-g may transmit the sidelink message 350 (e.g., PSSCH message, PSSCH transmission) based on successful or unsuccessful reception of the sidelink message 335 (e.g., PSSCH message, PSSCH transmission) from the UE 115-h. For example, based on receiving the sidelink message 335 (e.g., PSSCH message, PSSCH transmission), the UE 115-g may transmit, in the sidelink message 350 (e.g., PSSCH message, PSSCH transmission), an indication of time and frequency resources associated with the sidelink message 335 (e.g., PSSCH message, PSSCH transmission).

In some aspects, the UE 115-e may monitor for control information (e.g., sidelink control information, sidelink control indicators) over the beam 305-b, and the UE 115-e may monitor for control information (e.g., sidelink control information, sidelink control indicators), sidelink data transmissions (e.g., PSSCH messages, PSSCH transmissions), or both, over the beam 305-a. In some other examples, the UE 115-e may both monitor for control information (e.g., side-link control information, sidelink control indicators), sidelink data transmissions (e.g., PSSCH messages, PSSCH transmissions), or both, over the beam 305-a and monitor for control information (e.g., sidelink control information, sidelink control indicators) over the beam 305-b.

In some other examples, the UE 115-e may monitor for control information (e.g., sidelink control information, sidelink control indicators), sidelink data transmissions (e.g., PSSCH messages, PSSCH transmissions), or both, over any beam (e.g., the beam 305-a, the beam 305-b) or over any combination of beams (e.g., the beam 305-a and the beam 305-b). For example, the UE 115-e may both receive the sidelink message 330 (e.g., sidelink control information, a sidelink control indicator) over the beam 305-b and receive the sidelink message 345 (e.g., sidelink control information, a sidelink control indicator), the sidelink message 350 (e.g., PSSCH message, PSSCH transmission), or both over the beam 305-a.

Examples of aspects of resource identification and resource selection based on the sidelink message 340 (e.g., PSFCH message, PSFCH transmission), the sidelink message 345 (e.g., sidelink control information, a sidelink control indicator), and the sidelink message 350 (e.g., PSSCH message, PSSCH transmission) are described herein with reference to FIG. 4.

FIG. 4 illustrates an example of a timing diagram 400 that supports resource selection with sidelink receiver sensing and sidelink transmitter sensing in accordance with aspects of the present disclosure. In some aspects, the timing diagram 400 may be implemented by aspects of the wireless communications system 100, wireless communications system 200, and wireless communications system 300.

FIG. 4 illustrates an example of a sensing window 405 over which a UE 115 (e.g., UE 115-b of FIG. 2, UE 115-e of FIG. 3) may monitor for control information (e.g., control messages, SCI) from other UEs 115. Based on the control information (e.g., control messages, SCI) and a resource selection trigger 410, the UE 115 may identify or select resources in a resource selection window 415 for transmitting or receiving a sidelink data transmission. In an example, the UE 115 (e.g., UE 115-b of FIG. 2, UE 115-e of FIG. 3) may identify resources 425-a through resources 425-d which are reserved for communications (e.g., sidelink transmissions) by another UE 115 (e.g., UE 115-d of FIG. 2, UE 115-h of FIG. 3). In an example, the UE 115 (e.g., UE 115-b of FIG. 2, UE 115-e of FIG. 3) may identify resources for mitigating or eliminating interference with respect to transmitting or receiving sidelink transmissions. In some examples, the UE 115 may use at least a portion of the resource selection window 415 as a sensing window 405. Additionally, or alternatively, the sensing window 405 may be at least a portion of a previous resource selection window 415.

The sensing window 405 may have a temporal duration equal to a duration 430 (e.g., $T_0$) minus a processing duration 435 (e.g., $T_{proc,0}^{SL}$). The resource selection window 415 may have a temporal duration equal to a duration 440 (e.g., $T_2$) minus a duration 445 (e.g., $T_1$.)

A first example implementation is described with reference to FIG. 2 and the timing diagram 400 of FIG. 4. The UE 115-b may monitor for sidelink messages over a receive beam 210 selected for receiving data from the UE 115-a. The UE 115-b may monitor for control information during the sensing window 405 over one or more resources 425 (e.g., 425-a) configured for monitoring for control information. Within the sensing window 405, a portion of resources 425-a may include time and frequency resources over which the UE 115-b receives the sidelink message 225 (e.g., SCI) from the UE 115-d. In some aspects, a portion of the resources 425-a may include time and frequency resources over which sidelink message 230 (e.g., PSSCH message, PSSCH transmission) is transmitted from the UE 115-d to the UE 115-c. The sidelink message 225 (e.g., SCI) may include reservation parameters indicative of reservation information associated with the resources 425-a through resources 425-d.

In some aspects, the reservation information may include resource reservation period information associated with sidelink transmissions by the UE 115-d. For example, the resource reservation period information may include a duration 420 and the number of reserved resources associated with a reservation of the resources 425-a through resources 425-d. In some examples, the resource reservation period information may include a periodicity at which the UE 115-d reserves the resources 425-a through resources 425-d. For example, the resource reservation period information may include a periodicity at which the UE 115-d transmits the sidelink message 230 (e.g., PSSCH message, PSSCH transmission) over the resources 425-a through resources 425-d. In an example, the resource reservation period information may indicate a duration 450 between transmissions of the sidelink message 230 (e.g., PSSCH message, PSSCH transmission) by the UE 115-d. In some examples, the reservation information may include an indication of frequency resources associated with the resources 425-a through resources 425-d.

In some examples, the reservation information may include priority information associated with the resources 425-a through resources 425-d. For example, the reservation information may include priority information associated with the sidelink message 230 (e.g., PSSCH message, PSSCH transmission) transmitted from the UE 115-d to the UE 115-c. The priority information may include a priority level associated with the sidelink message 230 (e.g., PSSCH message, PSSCH transmission).

In an example, the UE 115-b may identify resources within the resource selection window 415 based on priority levels. For example, the UE 115-b may compare the priority level associated with the sidelink message 230 (e.g., PSSCH message, PSSCH transmission) transmitted by the UE 115-d to a priority level associated with the sidelink message 245 (e.g., PSSCH message, PSSCH transmission) to be transmitted by the UE 115-a. The UE 115-b may identify resources within the resource selection window 415 based on the comparison. For example, the UE 115-b may identify that the priority level associated with the sidelink message 230 (e.g., PSSCH message, PSSCH transmission) is higher than the priority level associated with the sidelink message 245 (e.g., PSSCH message, PSSCH transmission). In another example, the UE 115-b may identify that the priority level associated with the sidelink message 230 (e.g., PSSCH message, PSSCH transmission) is lower than the priority level associated with the sidelink message 245 (e.g., PSSCH message, PSSCH transmission). Based on the difference in priority level, for example, the UE 115-b may indicate (e.g., via sidelink message 235) resources which are exclusive (e.g., do not overlap) or inclusive (e.g., at least partially overlap) of the resources 425-a through resources 425-d reserved for the sidelink message 230 (e.g., PSSCH message, PSSCH transmission).

In an example, the UE 115-b may measure a reference signal received power (RSRP) value associated with the sidelink message 225 (e.g., SCI) or the sidelink message 230 received from the UE 115-d. The UE 115-b may identify resources within the resource selection window 415 based on the measured RSRP value and/or an interference threshold value associated with a UE 115 (e.g., UE 115-b or UE 115-c) receiving sidelink messages. In an example aspect, the UE 115-b may determine the interference threshold value based on the priority level associated with the sidelink message 230 (e.g., PSSCH message, PSSCH transmission) and the priority level associated with the sidelink message 245 (e.g., PSSCH message, PSSCH transmission). For instance, the UE 115-b may determine the interference threshold value according to a formula with the priority level associated with the sidelink message 230 and the priority level associated with the sidelink message 245 as variables, or may retrieve the interference threshold value from a look up table according to the priority level associated with the sidelink message 230 and the priority level associated with the sidelink message 245 (e.g., the priority levels may be indices of the table).

In some examples, the UE 115-b may determine the measured RSRP value associated with the sidelink message 225 (e.g., SCI) or the sidelink message 230 is greater than the interference threshold value. The UE 115-b may identify (e.g., assume) that transmitting the sidelink message 245 (e.g., PSSCH message, PSSCH transmission) over one or more of the resources 425-a through resources 425-d reserved for the sidelink message 230 (e.g., PSSCH message, PSSCH transmission) may interfere with the sidelink message 230. In an example, the UE 115-b may identify resources within the resource selection window 415 which are exclusive of (e.g., do not overlap) the resources 425-a through resources 425-d. The UE 115-b may transmit an indication of the available resources to the UE 115-a via sidelink message 235, which may mitigate or eliminate potential interference to transmission of the sidelink message 245 (e.g., PSSCH message, PSSCH transmission) by the UE 115-a and transmission of the sidelink message 230 (e.g., PSSCH message, PSSCH transmission) by the UE 115-d (and received by the UE 115-c).

In other examples, the UE 115-b may determine the measured RSRP value associated with the sidelink message 225 (e.g., SCI) or the sidelink message 230 is less than the interference threshold value. The UE 115-b may identify (assume) that transmitting the sidelink message 245 (e.g., PSSCH message, PSSCH transmission) over the resources 425-a through resources 425-d reserved for the sidelink message 230 (e.g., PSSCH message, PSSCH transmission) will not suffer interference (e.g., exceeding the threshold) from the sidelink message 230 (e.g., PSSCH message, PSSCH transmission). In an example, the UE 115-b may select resources within the resource selection window 415 to indicate to the UE 115-a (e.g., via sidelink message 235) for transmitting the sidelink message 245 (e.g., PSSCH message, PSSCH transmission), without strictly avoiding the resources 425-a to 425-d. For example, the UE 115-b may select resources which partially or completely overlap the resources 425-a through resources 425-d. In some aspects, the UE 115-a may transmit the sidelink message 245 (e.g., PSSCH message, PSSCH transmission) over some or all of the resources 425-a through resources 425-d.

A second example implementation is described with reference to FIG. 3 and the timing diagram 400 of FIG. 4. The UE 115-e may monitor for sidelink messages over a transmit beam 305-a selected for transmitting identified data to the UE 115-f. The UE 115-e may monitor for sidelink messages during the sensing window 405. Within the sensing window 405, a portion of resources 425-a may include time and frequency resources over which the UE 115-e receives the sidelink message 340 (e.g., PSFCH message, PSFCH transmission) from the UE 115-*g*. In some aspects, a portion of the resources 425-*a* may include time and frequency resources over which sidelink message 330 (e.g., sidelink control information, a sidelink control indicator) and sidelink message 335 (e.g., PSSCH message, PSSCH transmission) are transmitted from the UE 115-*h* to the UE 115-*g*. The sidelink message 340 (e.g., PSFCH message, PSFCH transmission) may include reservation parameters indicative of reservation information associated with the resources 425-*a* through resources 425-*d*.

In some aspects, the reservation information may include resource reservation period information associated with sidelink transmissions by the UE 115-*h*. For example, the resource reservation period information may include a duration 420 and the number of reserved resources associated with a reservation of the resources 425-*a* through resources 425-*d*. In some examples, the resource reservation period information may include a periodicity at which the UE 115-*h* reserves the resources 425-*a* through resources 425-*d*. For example, the resource reservation period information may include a periodicity at which the UE 115-*h* transmits the sidelink message 345 (e.g., sidelink control information, a sidelink control indicator) or the sidelink message 350 (e.g., PSSCH message, PSSCH transmission) over the resources 425-*a* through resources 425-*d*. In an example, the resource reservation period information may indicate a duration 450 between transmissions of the sidelink message 345 (e.g., sidelink control information, a sidelink control indicator) or the sidelink message 350 (e.g., PSSCH message, PSSCH transmission) by the UE 115-*h*.

In some examples, the reservation information may include priority information associated with the resources 425-*a* through resources 425-*d*. For example, the reservation information may include priority information associated with the sidelink message 335 (e.g., PSSCH message, PSSCH transmission) transmitted from the UE 115-*h* to the UE 115-*g*. The priority information may include a priority level associated with the sidelink message 335 (e.g., PSSCH message, PSSCH transmission).

In an example, the UE 115-*e* may identify resources within the resource selection window 415 based on priority levels. For example, the UE 115-*e* may compare the priority level associated with the sidelink message 335 (e.g., PSSCH message, PSSCH transmission) transmitted by the UE 115-*h* to a priority level associated with the sidelink message 325 (e.g., PSSCH message, PSSCH transmission) to be transmitted by the UE 115-*e*. The UE 115-*e* may identify resources within the resource selection window 415 based on the comparison. For example, the UE 115-*e* may identify that the priority level associated with the sidelink message 335 (e.g., PSSCH message, PSSCH transmission) is higher than the priority level associated with the sidelink message 325 (e.g., PSSCH message, PSSCH transmission). In another example, the UE 115-*e* may identify that the priority level associated with the sidelink message 335 (e.g., PSSCH message, PSSCH transmission) is lower than the priority level associated with the sidelink message 325 (e.g., PSSCH message, PSSCH transmission). Based on the difference in priority level, for example, the UE 115-*e* may transmit the sidelink message 325 (e.g., PSSCH message, PSSCH transmission) over resources which are exclusive (e.g., do not overlap) or inclusive (e.g., at least partially overlap) of the resources 425-*a* through resources 425-*d* reserved for the sidelink message 335 (e.g., PSSCH message, PSSCH transmission).

In some other aspects, the reservation information may include a quantity of data bits associated with transmitting sidelink feedback information. For example, the reservation information may include a quantity of bits associated with the sidelink message 340 (e.g., PSFCH message, PSFCH transmission). In an example, the quantity of bits may be equal to the sum of one bit for positive acknowledgement (ACK)/negative acknowledgement (NACK), a quantity of bits for a UE identifier, $\log_2$ (quantity of elements in sl-ResourceReservePeriodList, where sl-ResourceReservePeriodList may correspond to a list of resource reservation intervals allowed in or supported by the network), $\log_2$ (quantity of priority levels (8)), and a quantity of bits for indicating PSSCH resource location (e.g., time and frequency information of the sidelink message 335 (e.g., PSSCH message, PSSCH transmission)).

Accordingly, in some examples, the UE 115-*e* may monitor for and receive multiple PSFCH transmissions from multiple UEs 115 (e.g., UE 115-*g*, another UE 115) corresponding to multiple respective PSSCH transmissions (e.g., sidelink message 335, PSSCH transmissions other than sidelink message 335). In some aspects, multiple PSFCH transmissions corresponding to multiple respective PSSCH transmissions may be multiplexed. In some examples, cyclic shifts may be used to convey ACK/NACK information and UE identifiers associated with different UEs 115 (e.g., UE 115-*h*, another UE 115) transmitting a PSFCH message.

In an example, the UE 115-*e* may measure a RSRP value associated with the sidelink message 340 (e.g., PSFCH message, PSFCH transmission) received from the UE 115-*g*. The UE 115-*e* may identify resources within the resource selection window 415 based on the measured RSRP value and an interference threshold value associated with the UE 115-*g* receiving sidelink messages. For example, the threshold value may be associated with the UE 115-*g* receiving the sidelink message 335 (e.g., PSSCH message, PSSCH transmission). In an example aspect, the UE 115-*e* may determine the interference threshold value based on the priority level associated with the sidelink message 335 (e.g., PSSCH message, PSSCH transmission) and the priority level associated with the sidelink message 325 (e.g., PSSCH message, PSSCH transmission). In some aspects, the UE 115-*e* may determine the interference threshold value based on a function associated with calculating an interference threshold value based on priority levels. In some other aspects, the UE 115-*e* may determine the interference threshold value based on a lookup table inclusive of priority levels and respective interference threshold values. For example, the lookup table may include interference threshold values corresponding to different combinations of priority levels.

In some examples, the UE 115-*e* may determine the measured RSRP value associated with the sidelink message 340 (e.g., PSFCH message, PSFCH transmission) is greater than the interference threshold value associated with receiving the sidelink message 335 (e.g., PSSCH message, PSSCH transmission). The UE 115-*e* may identify (assume) that transmitting the sidelink message 325 (e.g., PSSCH message, PSSCH transmission) over the resources 425-*a* through resources 425-*d* reserved for the sidelink message 335 (e.g., PSSCH message, PSSCH transmission) may add an amount of interference which exceeds the interference threshold value. In an example, the UE 115-*e* may select resources within the resource selection window 415 which are exclusive of (e.g., do not overlap) the resources 425-*a* through resources 425-*d*. The UE 115-*e* may transmit the sidelink message 325 (e.g., PSSCH message, PSSCH transmission) over the selected resources, which may mitigate or eliminate potential interference between transmission of the sidelink message 325 (e.g., PSSCH message, PSSCH transmission) by the UE 115-*e* and transmission of the sidelink message 335 (e.g., PSSCH message, PSSCH transmission) by the UE 115-*h* (and received by the UE 115-*g*). In some aspects, transmitting the sidelink message 325 (e.g., PSSCH message, PSSCH transmission) over the selected resources may mitigate or eliminate potential interference between transmission of the sidelink message 325 (e.g., PSSCH message, PSSCH transmission) by the UE 115-*e* and reception of the sidelink message 335 (e.g., PSSCH message, PSSCH transmission) by the UE 115-*g*.

In other examples, the UE 115-*e* may determine the measured RSRP value associated with the sidelink message 340 (e.g., PSFCH message, PSFCH transmission) is less than the interference threshold value associated with receiving the sidelink message 335 (e.g., PSSCH message, PSSCH transmission). The UE 115-*e* may determine that any interference resulting from transmitting the sidelink message 325 (e.g., PSSCH message, PSSCH transmission) over the resources 425-*a* through resources 425-*d* reserved for the sidelink message 335 (e.g., PSSCH message, PSSCH transmission) may be less than the interference threshold value. In an example, the UE 115-*e* may select resources within the resource selection window 415 for transmitting the sidelink message 325 (e.g., PSSCH message, PSSCH transmission), without strictly avoiding the resources 425-*a* to 425-*d*. For example, the UE 115-*e* may select resources which partially or completely overlap the resources 425-*a* through resources 425-*d*. In some aspects, the UE 115-*e* may transmit the sidelink message 325 (e.g., PSSCH message, PSSCH transmission) over some or all of the resources 425-*a* through resources 425-*d*.

In some aspects, the transmit power level value associated with transmitting the sidelink message 340 (e.g., PSFCH message, PSFCH transmission) may be variable. For example, the UE 115-*g* may set (vary) the transmit power level to control (e.g., to a degree) the amount of interference the UE 115-*g* receives. In some aspects, the UE 115-*g* may set (vary) the transmit power level value based on an interference threshold value associated with receiving the sidelink message 335 (e.g., PSSCH message, PSSCH transmission) from the UE 115-*h*. In some examples, the UE 115-*g* may determine the interference threshold value based on a priority level associated with receiving the sidelink message 335 (e.g., PSSCH message, PSSCH transmission). In an example, the UE 115-*g* may identify the priority level based on priority information included in the sidelink message 330 (e.g., sidelink control information, a sidelink control indicator) received from the UE 115-*h*.

In an example, the UE 115-*g* may determine that the priority level associated with receiving the sidelink message 335 (e.g., PSSCH message, PSSCH transmission) is relatively high. In this case, the UE 115-*g* may transmit the sidelink message 340 (e.g., PSFCH message, PSFCH transmission) at a relatively high (e.g., maximum) power level at which the UE 115-*g* is capable of transmitting the sidelink message 340 (e.g., PSFCH message, PSFCH transmission). In another example, the UE 115-*g* may determine that the priority level associated with receiving the sidelink message 335 (e.g., PSSCH message, PSSCH transmission) is relatively low. In this case, the UE 115-*g* may transmit the sidelink message 340 (e.g., PSFCH message, PSFCH transmission) at a relatively low (e.g., minimum) power level.

A third example implementation is described with reference to FIG. 3 and the timing diagram 400 of FIG. 4. Within another sensing window (e.g., a sensing window that may at least partially overlap the resource selection window 415), the UE 115-*e* may receive an additional sidelink message 345 (e.g., sidelink control information, a sidelink control indicator), the sidelink message 350 (e.g., PSSCH message, PSSCH transmission), or both, from the UE 115-*g*. The sidelink message 345 (e.g., sidelink control information, a sidelink control indicator) may include resource parameters indicative of resource information associated with the resources 425-*a* through resources 425-*d*, or resources of a next resource selection window 415. In some aspects, the sidelink message 350 (e.g., PSSCH message, PSSCH transmission) may include the resource parameters indicative of resource information associated with the resources 425-*a* through resources 425-*d*.

The UE 115-*g* may transmit the sidelink message 345 (e.g., sidelink control information, a sidelink control indicator), the sidelink message 350 (e.g., PSSCH message, PSSCH transmission), or both, based on a recurring schedule. For example, the UE 115-*g* may transmit the sidelink message 345 (e.g., sidelink control information, a sidelink control indicator), the sidelink message 350 (e.g., PSSCH message, PSSCH transmission), or both, based on a periodicity. In some aspects, by transmitting the sidelink message 345 (e.g., sidelink control information, a sidelink control indicator), the sidelink message 350 (e.g., PSSCH message, PSSCH transmission), or both, the UE 115-*g* may inform other UEs 115 (e.g., UE 115-*e*) to avoid using the resources 425-*a* through resources 425-*d* over which the UE 115-*g* receives sidelink transmissions.

In some aspects, the resource information may include time and frequency information associated with the resources 425-*a* through resources 425-*d*. In some aspects, the resource information may include the duration 420 and the number of reserved resources associated with the resources 425-*a* through resources 425-*d*. In some examples, the resource information may include a periodicity associated with the resources 425-*a* through resources 425-*d*. For example, the resource information may include a periodicity with which the UE 115-*g* receives sidelink messages. In an example, the resource information may include a periodicity at which the UE 115-*g* receives sidelink messages such as, for example, the sidelink message 335 (e.g., PSSCH message, PSSCH transmission). In some examples, if the UE 115-*g* is not receiving sidelink transmissions, the UE 115-*g* may refrain from providing the resource information to other UEs 115 (e.g., UE 115-*e*). For example, if the UE 115-*g* has not received control information indicative of a sidelink transmission, the UE 115-*g* may refrain from transmitting the sidelink message 345 (e.g., sidelink control information, a sidelink control indicator) or the sidelink message 350 (e.g., PSSCH message, PSSCH transmission).

In an example, the resource information may include priority information associated with the sidelink message 335 (e.g., PSSCH message, PSSCH transmission) transmitted from the UE 115-*h* to the UE 115-*g*. The priority information may include a priority level associated with the sidelink message 335 (e.g., PSSCH message, PSSCH transmission). In some examples, the resource information may be beam specific. For example, the UE 115-*g* may transmit different resource information via different beams, corresponding to control information received via the different beams.

In an example, the UE 115-*e* may identify resources within the resource selection window 415 based on priority levels. For example, the UE 115-*e* may compare the priority level associated with the sidelink message 335 (e.g., PSSCH message, PSSCH transmission) transmitted by the UE 115-*h* to a priority level associated with the sidelink message 325 (e.g., PSSCH message, PSSCH transmission) to be transmitted by the UE 115-*e*. The UE 115-*e* may identify resources within the resource selection window 415 based on the comparison. For example, the UE 115-*e* may identify that the priority level associated with the sidelink message 335 (e.g., PSSCH message, PSSCH transmission) is higher than the priority level associated with the sidelink message 325 (e.g., PSSCH message, PSSCH transmission). In another example, the UE 115-*e* may identify that the priority level associated with the sidelink message 335 (e.g., PSSCH message, PSSCH transmission) is lower than the priority level associated with the sidelink message 325 (e.g., PSSCH message, PSSCH transmission). Based on the difference in priority level, the UE 115-*e* may transmit the sidelink message 325 (e.g., PSSCH message, PSSCH transmission) over resources which are exclusive (e.g., do not overlap) or inclusive (e.g., at least partially overlap) of the resources 425-*a* through resources 425-*d* over which the UE 115-*g* receives sidelink messages such as, for example, the sidelink message 335 (e.g., PSSCH message, PSSCH transmission).

In an example, the UE 115-*e* may identify a transmit power value associated with the sidelink message 345 (e.g., sidelink control information, a sidelink control indicator). For example, the UE 115-*e* may identify the transmit power value based on an indication included in the sidelink message 345 (e.g., sidelink control information, a sidelink control indicator). In an example, the UE 115-*e* may identify a transmit power value associated with the sidelink message 350 (e.g., PSSCH message, PSSCH transmission). For example, the UE 115-*e* may identify the transmit power value based on an indication included in the sidelink message 350 (e.g., PSSCH message, PSSCH transmission).

The UE 115-*e* may identify resources within the resource selection window 415 based on the transmit power value associated with the sidelink message 345 (e.g., sidelink control information, a sidelink control indicator) and an interference threshold value associated with the UE 115-*g* receiving sidelink messages. For example, the threshold value may be associated with the UE 115-*g* receiving the sidelink message 335 (e.g., PSSCH message, PSSCH transmission). In another example, the UE 115-*e* may identify resources within the resource selection window 415 based on the transmit power value associated with the sidelink message 350 (e.g., PSSCH message, PSSCH transmission) and the interference threshold value.

In an example aspect, the UE 115-*e* may determine the interference threshold value based on the priority level associated with the sidelink message 335 (e.g., PSSCH message, PSSCH transmission) and the priority level associated with the sidelink message 325 (e.g., PSSCH message, PSSCH transmission). For example, the UE 115-*e* may determine the interference threshold value based on a function associated with calculating an interference threshold value based on the priority levels. In some other aspects, the UE 115-*e* may determine the interference threshold value based on a lookup table inclusive of the priority levels and respective interference threshold values. For example, the lookup table may include interference threshold values corresponding to different combinations of the priority levels. In some aspects, the interference threshold value may be indicated in the sidelink message 345 (e.g., sidelink control information, a sidelink control indicator) received from the UE 115-*g*. In some other aspects, the interference threshold value may be indicated in the sidelink message 350 (e.g., PSSCH message, PSSCH transmission) received from the UE 115-*g*.

In some examples, the UE 115-*e* may calculate a path loss associated with the sidelink message 345 (e.g., sidelink control information, a sidelink control indicator) based on a measured RSRP value associated with the sidelink message 345 (e.g., sidelink control information, a sidelink control indicator) and the transmit power value associated with the sidelink message 345 (e.g., sidelink control information, a sidelink control indicator). In some aspects, the UE 115-*e* may determine based on the calculated pathloss whether transmitting the sidelink message 325 (e.g., PSSCH message, PSSCH transmission) at a given transmit power (e.g., transmit power associated with a scheduled modulation and coding scheme or desired block error rate) would result in interference at UE 115-*g* that is greater than the interference threshold value.

In an example, the UE 115-*e* may determine that transmitting the sidelink message 325 (e.g., PSSCH message, PSSCH transmission) over the resources 425-*a* through resources 425-*d* reserved for receiving the sidelink message 335 (e.g., PSSCH message, PSSCH transmission) at a transmit power associated with transmitting the sidelink message 325 (e.g., PSSCH message, PSSCH transmission) may add an amount of interference which exceeds the interference threshold value. In an example, the UE 115-*e* may select resources within the resource selection window 415 which are exclusive of (e.g., do not overlap) the resources 425-*a* through resources 425-*d*. The UE 115-*e* may transmit the sidelink message 325 (e.g., PSSCH message, PSSCH transmission) over the selected resources, which may mitigate or eliminate potential interference between transmission of the sidelink message 325 (e.g., PSSCH message, PSSCH transmission) by the UE 115-*e* and reception of the sidelink message 335 (e.g., PSSCH message, PSSCH transmission) by the UE 115-*g*.

In another example, the UE 115-*e* may determine based on the calculated path loss that the transmission of sidelink message 325 at a given transmit power (e.g., transmit power associated with a scheduled modulation and coding scheme or desired block error rate) would result in interference that is less than the interference threshold value. In such a case, the UE 115-*e* may identify (assume) that any interference resulting from transmitting the sidelink message 325 (e.g., PSSCH message, PSSCH transmission) over the resources 425-*a* through resources 425-*d* reserved for receiving the sidelink message 335 (e.g., PSSCH message, PSSCH transmission) may be less than the interference threshold value. In an example, the UE 115-*e* may select resources within the resource selection window 415 for transmitting the sidelink message 325 (e.g., PSSCH message, PSSCH transmission), without strictly avoiding the resources 425-*a* to 425-*d*. For example, the UE 115-*e* may select resources which partially or completely overlap the resources 425-*a* through resources 425-*d*. In some aspects, the UE 115-*e* may transmit the sidelink message 325 (e.g., PSSCH message, PSSCH transmission) over some or all of the resources 425-*a* through resources 425-*d*.

The example aspects described with respect to the UE 115-*e* selecting resources within the resource selection window 415 based on the transmit power value and calculated path loss associated with the sidelink message 345 (e.g., sidelink control information, a sidelink control indicator) and the interference threshold value may be applied to the transmit power value associated with the sidelink message 350 (e.g., PSSCH message, PSSCH transmission). For example, the UE 115-*e* may calculate the path loss associated with the sidelink message 350 (e.g., PSSCH message, PSSCH transmission) based on a measured RSRP value associated with the sidelink message 350 (e.g., PSSCH message, PSSCH transmission) and the transmit power value associated with the sidelink message 350 (e.g., PSSCH message, PSSCH transmission). In some aspects, the UE 115-e may determine based on the calculated path loss whether the transmission of sidelink message 325 at a given transmit power (e.g., transmit power associated with a scheduled modulation and coding scheme or desired block error rate) would result in interference that is greater than or less than the interference threshold value. In an example, the UE 115-e may select resources within the resource selection window 415 over which to transmit the sidelink message 325 (e.g., PSSCH message, PSSCH transmission), based on the transmit power value and the calculated path loss associated with the sidelink message 345 (e.g., sidelink control information, a sidelink control indicator) and the interference threshold value.

Figure 5:
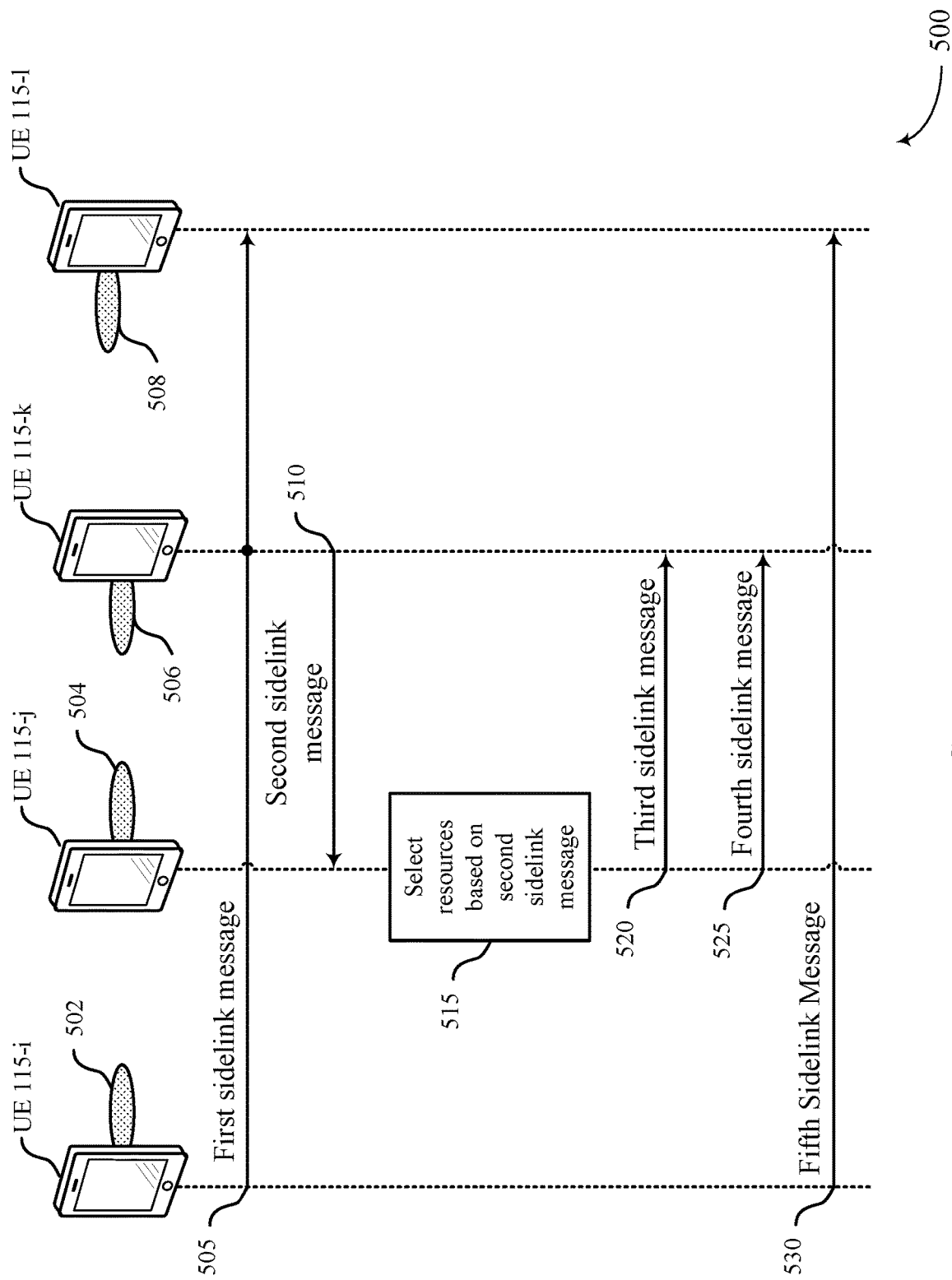
FIG. 5 illustrates an example of a process flow that supports resource selection with sidelink receiver sensing in accordance with aspects of the present disclosure.

FIG. 5 illustrates an example of a process flow 500 that supports resource selection with sidelink receiver sensing in accordance with aspects of the present disclosure. In some examples, process flow 500 may implement aspects of wireless communications systems 100, wireless communications system 200, wireless communications system 300, or timing diagram 400. Further, process flow 500 may be implemented by a UE 115-i through a UE 115-l, which may be examples of a UE 115 described with reference to FIG. 1 and UE 115-a through UE 115-d described with reference to FIG. 2.

In the following description of the process flow 500, the operations between the UE 115-i through the UE 115-l may be transmitted in a different order than the order shown, or the operations performed by the UE 115-i through the UE 115-l may be performed in different orders or at different times. Certain operations may also be left out of the process flow 500, or other operations may be added to the process flow 500. It is to be understood that while the UE 115-i through the UE 115-l are shown performing a number of the operations of process flow 500, any wireless device may perform the operations shown.

In some examples, UE 115-j may be positioned between UEs 115-i and 115-k and UE 115-k may be positioned between UEs 115-j and 115-l. Additionally, or alternatively, UEs 115-j and/or 115-k may be positioned between UEs 115-i and 115-l. In some examples, UE 115-i may be configured to communicate sidelink messages via a first beam 502, UE 115-j may be configured to communicate sidelink messages via a second beam 504, UE 115-k may be configured to communicate sidelink messages via third beam 506, and UE 115-j may be configured to communicate sidelink messages via a fourth beam 508. In some examples, the first beam 502 and the second beam 504 may be directed more closely in a first direction and the third beam 506 and the fourth beam 508 may be directed more closely in a second direction opposing the first direction. Some or each of the transmissions described herein (e.g., the first sidelink message through the fifth sidelink message) may be assumed to be transmitted via the beam of the corresponding described transmit UE 115 and may be assumed to be received via the beam of the corresponding described receive UE 115.

At 505, the UE 115-i may transmit a first sidelink message (e.g., an SCI) to the UE 115-l over a sidelink channel. The first sidelink message may include an indication of first resources of the sidelink channel reserved by the UE 115-i for a fifth sidelink message (e.g., PSSCH) by the UE 115-i to UE 115-l. In some examples, the UE 115-k may intercept the first sidelink message over the sidelink channel.

At 510, the UE 115-k may transmit, to the UE 115-j, a second sidelink message over the sidelink channel. The second sidelink message may include an indication of second resources of the sidelink channel. In some examples, the second resources of the sidelink channel may be exclusive of the first resources of the sidelink channel. Alternatively, the second resources of the sidelink channel may correspond to or include the first resources of the sidelink channel.

At 515, the UE 115-j may select third resources of the sidelink channel for a fourth sidelink message to the UE 115-k based on the second sidelink message including the indication of second resources.

At 520, the UE 115-j may transmit a third sidelink message (e.g., SCI) to the UE 115-k based on receiving the second sidelink message. The third sidelink message may allocate third resources of the sidelink channel for the fourth sidelink message. In some examples, the third resources may be selected from the second resources (e.g., if the second resources are exclusive of the first resources). Alternatively, the third resources may be exclusive of the second resources (e.g., if the second resources correspond to or include the first resources).

At 525, the UE 115-j may transmit the fourth sidelink message (e.g., PSSCH) to the UE 115-k over the third resources based on receiving the second sidelink message from the UE 115-k. The fourth sidelink message may include data for the UE 115-j.

In some examples, the UE 115-k may determine availability of the first resources for inclusion in the third resources based on comparing a signal metric of the first sidelink message or the fifth sidelink message to a threshold. In some examples, the UE 115-k may determine the threshold based on a priority of the fifth sidelink message (e.g., PSSCH), a priority of the fourth sidelink message (e.g., PSSCH), or any combination thereof. In some examples, the second resources indicate that the first resources are available for inclusion in the third resources based on the signal metric not satisfying the threshold. Additionally, or alternatively, the second resources may indicate that the first resources are not available for inclusion in the third resources based on the signal metric satisfying the threshold.

In some examples, the second sidelink message may be associated with a time window and the second resources may indicate available resources for the fourth sidelink message within the time window. In some examples, the first resources may include a set of periodic resources and the second resources may indicate resources exclusive of each of the set of periodic resources occurring within the time window. In some examples, the first sidelink message may include SCI including the indication of the first resources.

Figure 6:
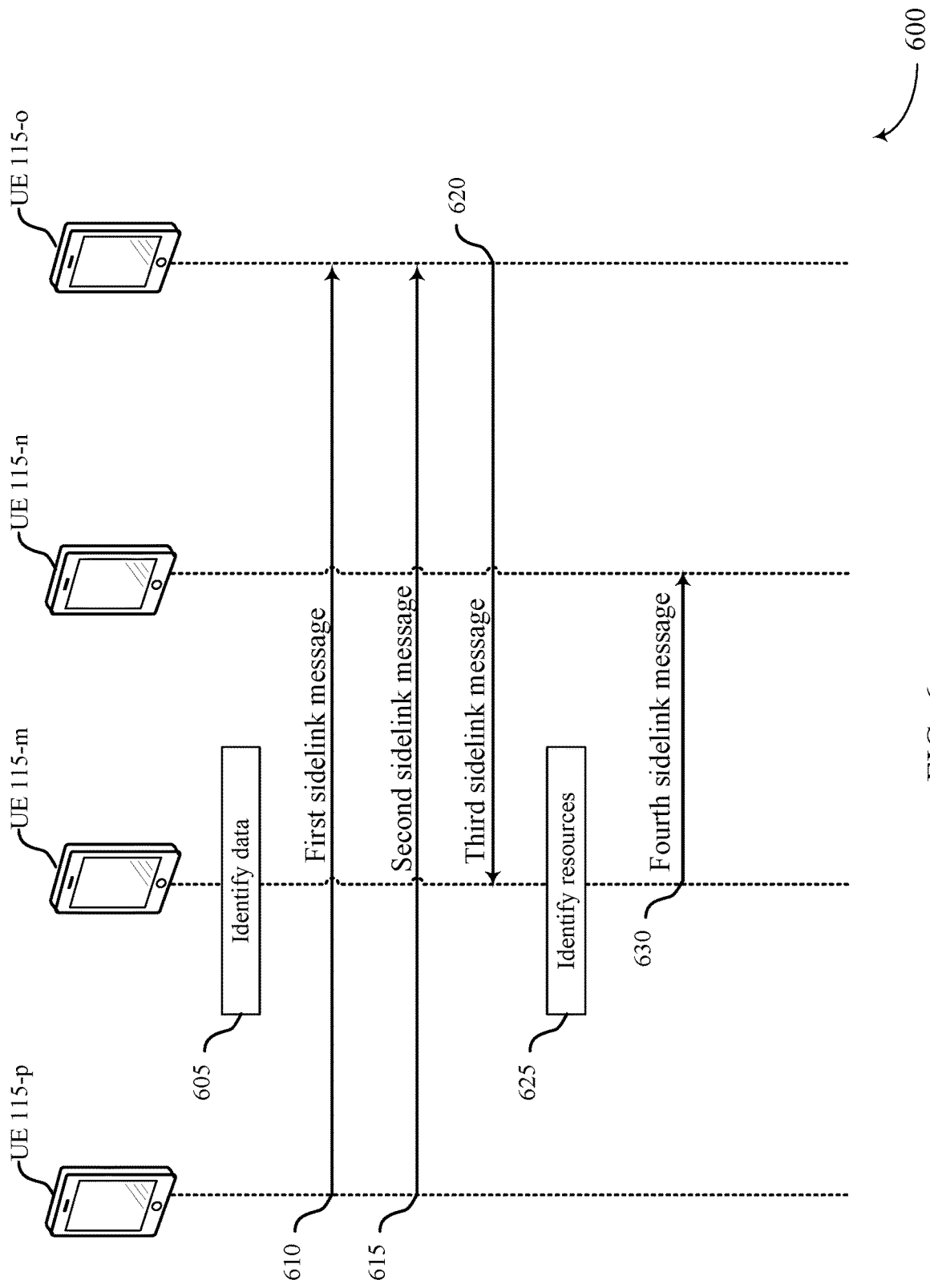
FIG. 6 illustrates an example of a process flow that supports resource selection with sidelink transmitter sensing in accordance with aspects of the present disclosure.

FIG. 6 illustrates an example of a process flow 600 that supports resource selection with sidelink transmitter sensing in accordance with aspects of the present disclosure. In some examples, process flow 600 may implement aspects of wireless communications systems 100, wireless communications system 200, wireless communications system 300, or timing diagram 400. Further, process flow 600 may be implemented by a UE 115-m through a UE 115-p, which may be examples of a UE 115 described with reference to FIG. 1 and UE 115-e through UE 115-h described with reference to FIG. 3.

In the following description of the process flow 600, the operations between UE 115-m through UE 115-p may be transmitted in a different order than the order shown, or the operations performed by UE 115-m through UE 115-p may be performed in different orders or at different times. Certain operations may also be left out of the process flow 600, or other operations may be added to the process flow 600. It is to be understood that while UE 115-m through UE 115-p are shown performing a number of the operations of process flow 600, any wireless device may perform the operations shown.

At 605, the UE 115-*m* may identify data for transmission to the UE 115-*n* over a sidelink channel.

At 610, the UE 115-*o* may receive a first sidelink message from the UE 115-*p*. In some examples, the first sidelink message may include an indication of first resources reserved by the UE 115-*p* for a second sidelink message by the UE 115-*p* to the UE 115-*o*. For example, the first sidelink message may be transmitted via a sidelink control channel. In an example, the first sidelink message may include control information (e.g., SCI).

At 615, the UE 115-*o* may receive the second sidelink message from the UE 115-*p* over the first resources. In some examples, the second sidelink message may include data. For example, the second sidelink message may include a PSSCH transmission.

At 620, the UE 115-*o* may transmit a third sidelink message to the UE 115-*m* based on the first sidelink message. In some examples, the third sidelink message may include the indication of the first resources reserved by the UE 115-*p*. In some aspects, the third sidelink message may be transmitted via a sidelink feedback channel. For example, the third sidelink message may include a PSFCH transmission. In some other aspects, the third sidelink message may be transmitted via a sidelink control channel, a sidelink data channel, or both. For example, the third sidelink message may include control information (e.g., SCI). In another example, the third sidelink message may include a PSSCH transmission.

In an example, the UE 115-*m* may monitor for one or more sidelink messages among a set of UEs, over a beam selected for the transmission of the identified data to the UE 115-*n*. In an example, the set of UEs may include the UE 115-*n*, the UE 115-*o*, and the UE 115-*p*. The UE 115-*m* may identify a sensing window including a set of time and frequency resources associated with one or more sidelink messages, and the UE 115-*m* may monitor for the one or more sidelink messages based on the identified sensing window. In an example, the UE 115-*m* may receive the third sidelink message based on the monitoring.

At 625, the UE 115-*m* may identify second resources of the sidelink channel based on the indication of the first resources reserved by the UE 115-*p*. In some examples, the UE 115-*m* may identify the second resources from among a set of available resources exclusive of the first resources. In some examples, the second resources may be exclusive of the first resources reserved by the UE 115-*p*.

In some aspects, the UE 115-*m* may identify a set of reservation parameters associated with the first resources based on the indication of the first resources. In an example, the UE 115-*m* may identify reservation information associated with the first resources based on the set of reservation parameters. In some examples, the reservation information may include a duration and the number of reserved resources associated with a reservation of the first resources by the UE 115-*p*, a periodicity associated with the reservation of the first resources by the UE 115-*p*, a quantity of reservations of the first resources by the UE 115-*p*, time and frequency information associated with the first resources, or a combination thereof. In an example, the UE 115-*m* may identify the second resources of the sidelink channel based on the identified reservation information.

In some other aspects, the UE 115-*m* may identify a set of resource parameters associated with the first resources based on the indication of the first resources. In an example, the UE 115-*m* may identify resource information associated with the first resources based on the set of resource parameters. In some examples, the resource information may include a periodicity associated with the first resources, time and frequency information associated with the first resources, priority information associated with the second sidelink message, or a combination thereof. In an example, the UE 115-*m* may identify the second resources of the sidelink channel based on the identified resource information.

In some aspects, the UE 115-*m* may identify first priority information associated with the second sidelink message based on the indication of the first resources. The UE 115-*m* may identify second priority information associated with transmitting a fourth sidelink message to the UE 115-*n*. In an example, identifying the second resources of the sidelink channel may be based on comparing the identified first priority information and the identified second priority information.

In some aspects, the UE 115-*m* may measure a RSRP value associated with the third sidelink message. In an example, the UE 115-*m* may identify the second resources of the sidelink channel based on the measured RSRP value. In some examples, the UE 115-*m* may determine first priority information associated with the second sidelink message based on the indication of the first resources. In an example, the UE 115-*m* may determine an interference threshold value associated with the second sidelink message based on the first priority information associated with the second sidelink message and second priority information associated with transmitting the fourth sidelink message. In some aspects, the UE 115-*m* may identify the second resources of the sidelink channel based on the measured RSRP value satisfying the interference threshold value.

In some other aspects, the UE 115-*m* may identify a transmit power value associated with the third sidelink message. In an example, the UE 115-*m* may identify the second resources of the sidelink channel based on the identified transmit power value and the measured RSRP value. In some examples, the UE 115-*m* may determine first priority information associated with the second sidelink message based on the indication of the first resources. In an example, the UE 115-*m* may determine an interference threshold value associated with the second sidelink message based on the first priority information associated with the second sidelink message and second priority information associated with transmitting the fourth sidelink message. In some aspects, the UE 115-*m* may identify the second resources of the sidelink channel based on the calculated receive power of the fourth sidelink message at UE 115-*o* (based on a path loss value calculated from the measured RSRP value) satisfying the interference threshold value.

At 630, the UE 115-*m* may transmit the fourth sidelink message to the UE 115-*n* over the second resources. The fourth sidelink message may include data. In an example, the fourth sidelink message may include a PSSCH transmission.

Figure 7:
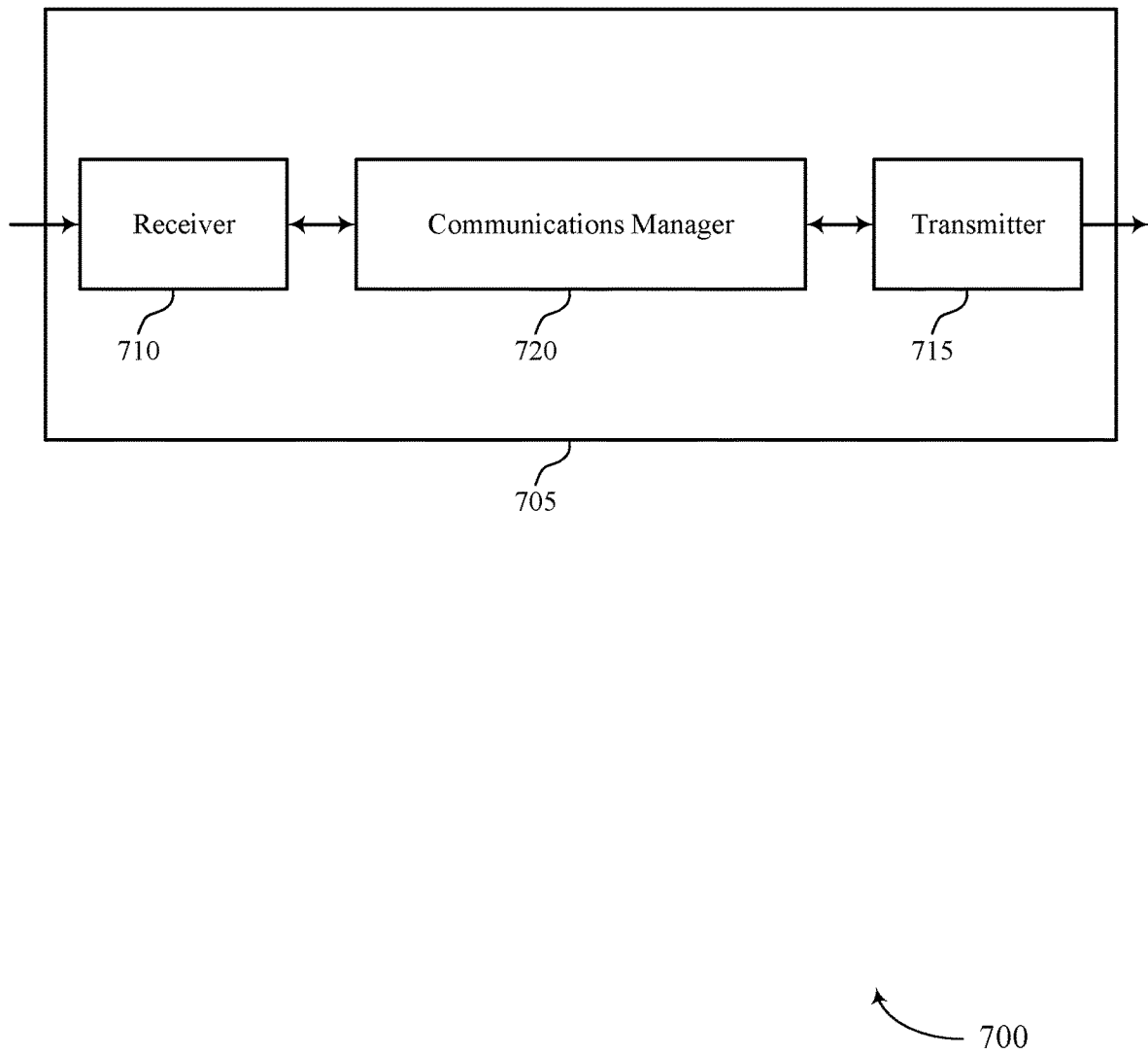
FIGS. 7 and 8 show block diagrams of devices that support resource selection with sidelink receiver sensing and sidelink transmitter sensing in accordance with aspects of the present disclosure.

FIG. 7 shows a block diagram 700 of a device 705 that supports resource selection with sidelink receiver sensing and sidelink transmitter sensing in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource selection with sidelink receiver sensing). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource selection with sidelink receiver sensing). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of resource selection with sidelink receiver sensing as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for receiving a first sidelink message over a sidelink channel, the first sidelink message including an indication of first resources of the sidelink channel reserved for a second sidelink message. The communications manager 720 may be configured as or otherwise support a means for transmitting, to a second UE, a third sidelink message over the sidelink channel, the third sidelink message including an indication of second resources of the sidelink channel. The communications manager 720 may be configured as or otherwise support a means for receiving, from the second UE, a fourth sidelink message over third resources of the sidelink channel based on transmitting the third sidelink message to the second UE, the fourth sidelink message including data for the first UE.

Additionally, or alternatively, the communications manager 720 may support wireless communication at a first UE in accordance with examples as disclosed herein. For example, the communications manager 720 may be configured as or otherwise support a means for receiving, from a second UE, a first sidelink message over a sidelink channel, the first sidelink message including an indication of first resources of the sidelink channel. The communications manager 720 may be configured as or otherwise support a means for selecting second resources of the sidelink channel for a second sidelink message to the second UE based on the first sidelink message including the indication of first resources. The communications manager 720 may be configured as or otherwise support a means for transmitting, to the second UE, a third sidelink message over the sidelink channel, where the third sidelink message allocates the second resources for the second sidelink message to the second UE. The communications manager 720 may be configured as or otherwise support a means for transmitting, to the second UE, the second sidelink message over the second resources, where the second sidelink message includes data for the second UE.

Additionally, or alternatively, the communications manager 720 may support wireless communication at a first UE in accordance with examples as disclosed herein. For example, the communications manager 720 may be configured as or otherwise support a means for identifying data for transmission over a sidelink channel. The communications manager 720 may be configured as or otherwise support a means for receiving a first sidelink message from a second UE, the first sidelink message including an indication of first resources reserved for a second sidelink message to the second UE. The communications manager 720 may be configured as or otherwise support a means for identifying second resources of the sidelink channel based on the first resources. The communications manager 720 may be configured as or otherwise support a means for transmitting a third sidelink message including the data over the second resources.

Additionally, or alternatively, the communications manager 720 may support wireless communication at a first UE in accordance with examples as disclosed herein. For example, the communications manager 720 may be configured as or otherwise support a means for receiving a first sidelink message from a second UE including an indication of first resources reserved by the second UE for a second sidelink message by the second UE to the first UE. The communications manager 720 may be configured as or otherwise support a means for receiving the second sidelink message from the second UE over the first resources, the second sidelink message including data. The communications manager 720 may be configured as or otherwise support a means for transmitting a third sidelink message to a third UE based on the first sidelink message, the third sidelink message including the indication of the first resources reserved by the second UE.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for enabling a transmitting UE to identify resources reserved for transmissions of neighboring UEs when the transmitting UE uses a beam configured in a direction different from which the transmissions of neighboring UEs are to be received. Accordingly, the transmitting UE may make determinations corresponding to resources that the transmitting UE uses to perform transmission relative to the resources of the neighboring UEs.

Figure 8:
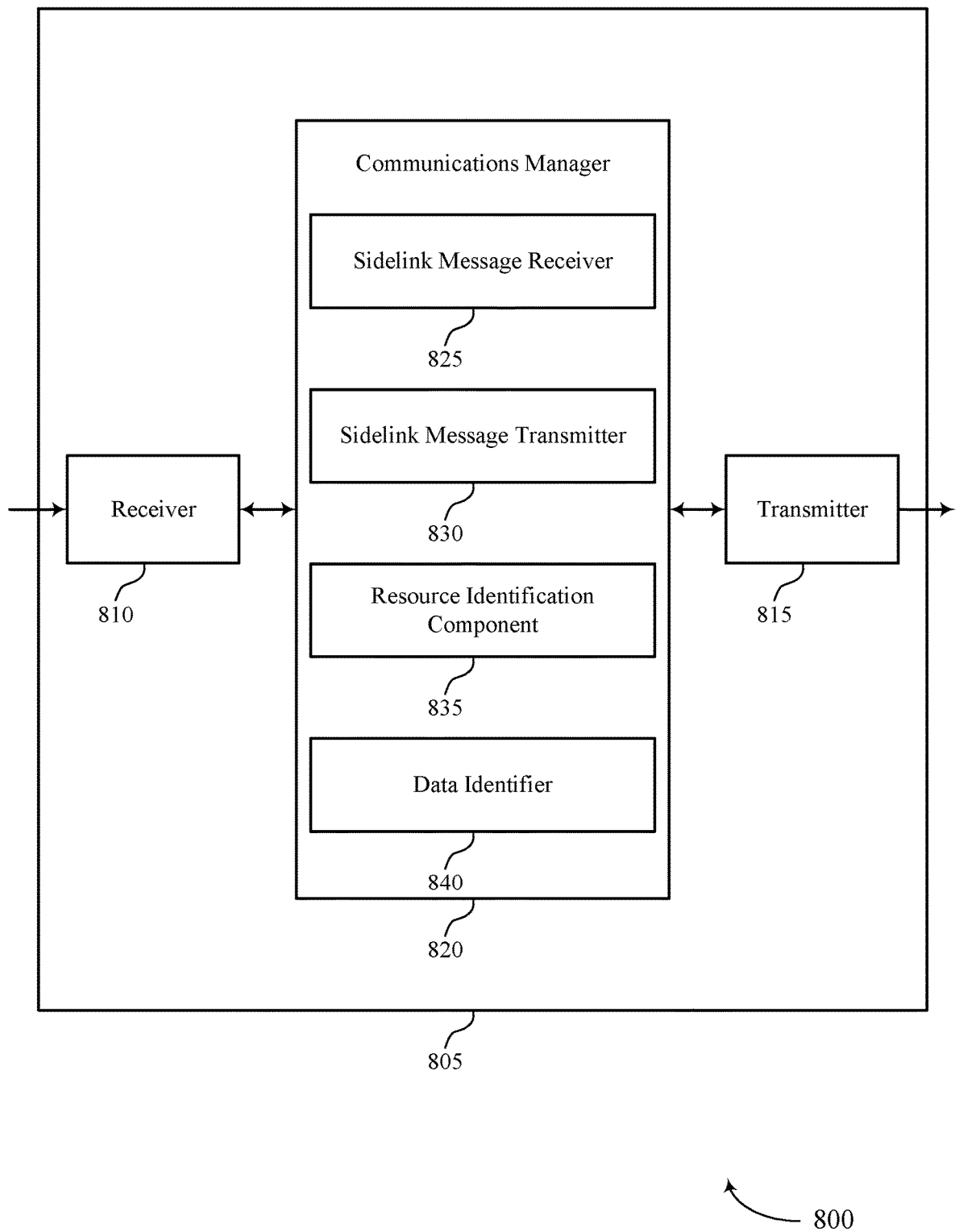

FIG. 8 shows a block diagram 800 of a device 805 that supports resource selection with sidelink receiver sensing and sidelink transmitter sensing in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to resource selection with sidelink receiver sensing). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to resource selection with sidelink receiver sensing). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of resource selection with sidelink receiver sensing as described herein. For example, the communications manager 820 may include a sidelink message receiver 825, a sidelink message transmitter 830, a resource identification component 835, a data identifier 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The sidelink message receiver 825 may be configured as or otherwise support a means for receiving a first sidelink message over a sidelink channel, the first sidelink message including an indication of first resources of the sidelink channel reserved for a second sidelink message. The sidelink message transmitter 830 may be configured as or otherwise support a means for transmitting, to a second UE, a third sidelink message over the sidelink channel, the third sidelink message including an indication of second resources of the sidelink channel. The sidelink message receiver 825 may be configured as or otherwise support a means for receiving, from the second UE, a fourth sidelink message over third resources of the sidelink channel based on transmitting the third sidelink message to the second UE, the fourth sidelink message including data for the first UE.

Additionally, or alternatively, the communications manager 820 may support wireless communication at a first UE in accordance with examples as disclosed herein. The sidelink message receiver 825 may be configured as or otherwise support a means for receiving, from a second UE, a first sidelink message over a sidelink channel, the first sidelink message including an indication of first resources of the sidelink channel. The resource identification component 835 may be configured as or otherwise support a means for selecting second resources of the sidelink channel for a second sidelink message to the second UE based on the first sidelink message including the indication of first resources. The sidelink message transmitter 830 may be configured as or otherwise support a means for transmitting, to the second UE, a third sidelink message over the sidelink channel, where the third sidelink message allocates the second resources for the second sidelink message to the second UE. The sidelink message transmitter 830 may be configured as or otherwise support a means for transmitting, to the second UE, the second sidelink message over the second resources, where the second sidelink message includes data for the second UE.

Additionally, or alternatively, the communications manager 820 may support wireless communication at a first UE in accordance with examples as disclosed herein. The data identifier 840 may be configured as or otherwise support a means for identifying data for transmission to a second UE over a sidelink channel. The sidelink message receiver 825 may be configured as or otherwise support a means for receiving a first sidelink message from a third UE, the first sidelink message including an indication of first resources reserved by a fourth UE for a second sidelink message by the fourth UE to the third UE. The resource identification component 835 may be configured as or otherwise support a means for identifying second resources of the sidelink channel based on the indication of the first resources reserved by the fourth UE. The sidelink message transmitter 830 may be configured as or otherwise support a means for transmitting a third sidelink message including the data to the second UE over the second resources.

Additionally, or alternatively, the communications manager 820 may support wireless communication at a first UE in accordance with examples as disclosed herein. The sidelink message receiver 825 may be configured as or otherwise support a means for receiving a first sidelink message from a second UE including an indication of first resources reserved by the second UE for a second sidelink message by the second UE to the first UE. The sidelink message receiver 825 may be configured as or otherwise support a means for receiving the second sidelink message from the second UE over the first resources, the second sidelink message including data. The sidelink message transmitter 830 may be configured as or otherwise support a means for transmitting a third sidelink message to a third UE based on the first sidelink message, the third sidelink message including the indication of the first resources reserved by the second UE.

Figure 9:
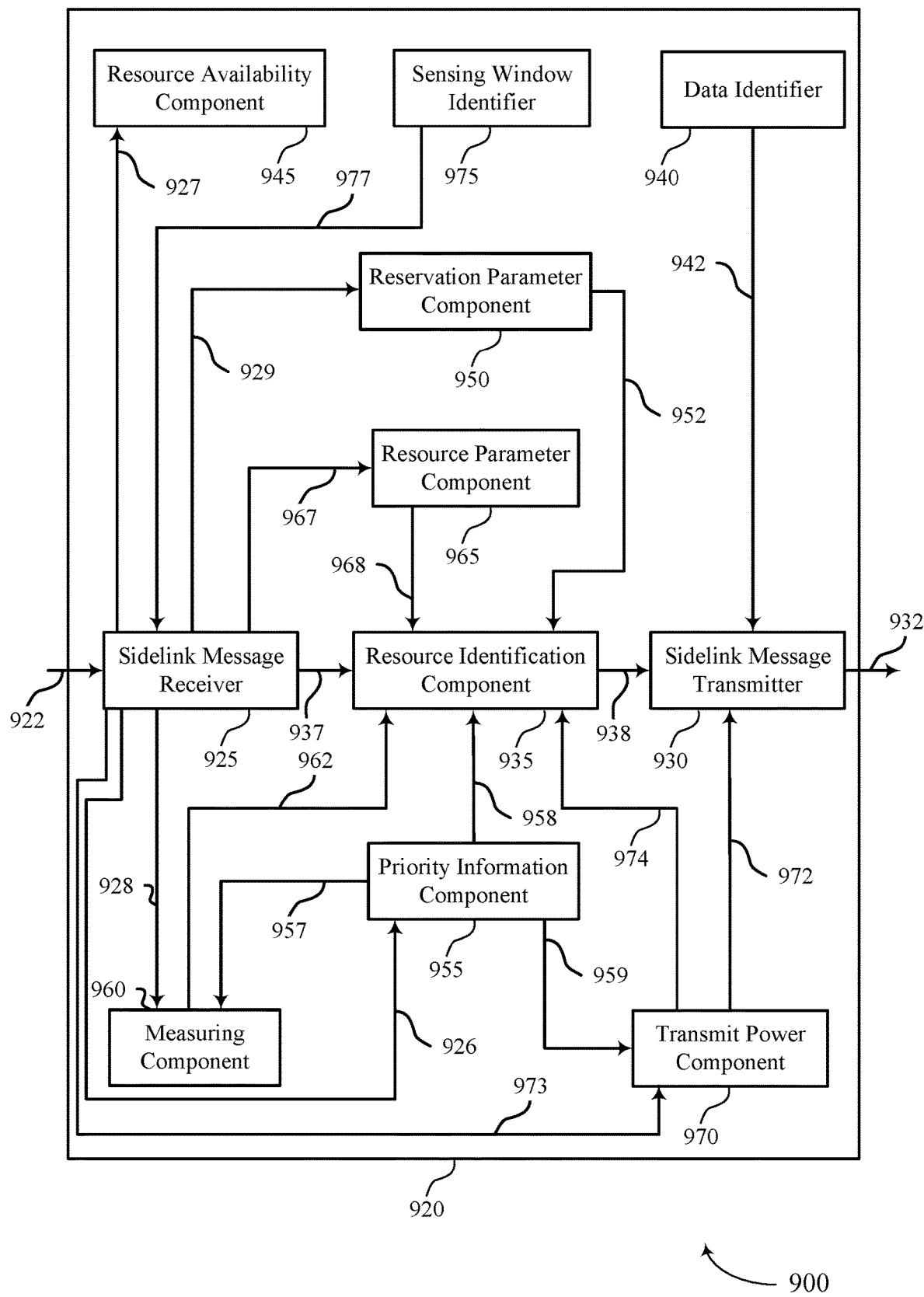
FIG. 9 shows a block diagram of a communications manager that supports resource selection with sidelink receiver sensing and sidelink transmitter sensing in accordance with aspects of the present disclosure.

FIG. 9 shows a block diagram 900 of a communications manager 920 that supports resource selection with sidelink receiver sensing and sidelink transmitter sensing in accordance with aspects of the present disclosure. The communications manager 920 may be an example of aspects of a communications manager 720, a communications manager 820, or both, as described herein. The communications manager 920, or various components thereof, may be an example of means for performing various aspects of resource selection with sidelink receiver sensing as described herein. For example, the communications manager 920 may include a sidelink message receiver 925, a sidelink message transmitter 930, a resource identification component 935, a data identifier 940, a resource availability component 945, a reservation parameter component 950, a priority information component 955, a measuring component 960, a resource parameter component 965, a transmit power component 970, a sensing window identifier 975, or any combination thereof. Each of these components may communicate, directly or indirectly, with one another (e.g., via one or more buses).

The communications manager 920 may support wireless communication at a first UE in accordance with examples as disclosed herein. The sidelink message receiver 925 may be configured as or otherwise support a means for receiving a first sidelink message (e.g., a sidelink message 922) over a sidelink channel, the first sidelink message including an indication of first resources of the sidelink channel reserved by the second UE for a second sidelink message. The sidelink message transmitter 930 may be configured as or otherwise support a means for transmitting, to a second UE, a third sidelink message (e.g., a sidelink message 932) over the sidelink channel, the third sidelink message including an indication of second resources of the sidelink channel. In some examples, the sidelink message receiver 925 may be configured as or otherwise support a means for receiving, from the second UE, a fourth sidelink message (e.g., a sidelink message 922) over third resources of the sidelink channel based on transmitting the third sidelink message (e.g., a sidelink message 932) to the second UE, the fourth sidelink message including data for the first UE.

In some examples, the sidelink message receiver 925 may be configured as or otherwise support a means for receiving a fifth sidelink message (e.g., a sidelink message 922) from the second UE based on transmitting the third sidelink message to the second UE, where the fifth sidelink message allocates the third resources of the sidelink channel for the fourth sidelink message. In some examples, the second resources of the sidelink channel are exclusive of the first resources of the sidelink channel. In some examples, the third resources are selected from the second resources. In some examples, the fifth sidelink message is transmitted via a sidelink control channel. In some examples, the second resources of the sidelink channel include the first resources of the sidelink channel. In some examples, the third resources are exclusive of the second resources.

In some examples, the resource availability component 945 may be configured as or otherwise support a means for determining availability of the first resources for inclusion in the third resources based on comparing a signal metric of the first sidelink message or the second sidelink message to a threshold. In some examples, the resource availability component 945 may be configured as or otherwise support a means for determining the threshold based on a priority of the second sidelink message, a priority of the fourth sidelink message, or a combination thereof. In some examples, the second resources indicate that the first resources are available for inclusion in the third resources based on the signal metric not satisfying the threshold. In some examples, the second resources indicate that the first resources are not available for inclusion in the third resources based on the signal metric satisfying the threshold. In some examples, resource availability component 945 may receive an indication of the first resources 927 from sidelink message receiver 925.

In some examples, the third sidelink message is associated with a time window. In some examples, the second resources indicate available resources for the fourth sidelink message within the time window. In some examples, the first resources include a set of periodic resources and the second resources indicate resources exclusive of each of the set of periodic resources occurring within the time window. In some examples, the first sidelink message includes sidelink control information including the indication of the first resources.

Additionally, or alternatively, the communications manager 920 may support wireless communication at a first UE in accordance with examples as disclosed herein. In some examples, the sidelink message receiver 925 may be configured as or otherwise support a means for receiving, from a second UE, a first sidelink message (e.g., a sidelink message 922) over a sidelink channel, the first sidelink message including an indication of first resources of the sidelink channel. The resource identification component 935 may be configured as or otherwise support a means for selecting second resources of the sidelink channel for a second sidelink message to the second UE based on the first sidelink message including the indication of first resources. In some examples, the resource identification component 935 may receive an indication of the first resources 937 from sidelink message receiver 925. In some examples, the sidelink message transmitter 930 may be configured as or otherwise support a means for transmitting, to the second UE, a third sidelink message (e.g., a sidelink message 932) over the sidelink channel, where the third sidelink message allocates the second resources for the second sidelink message to the second UE. In some examples, the sidelink message transmitter 930 may receive an indication of the second resources from resource identification component 935. In some examples, the sidelink message transmitter 930 may be configured as or otherwise support a means for transmitting, to the second UE, the second sidelink message (e.g., a sidelink message 932) over the second resources, where the second sidelink message includes data for the second UE.

In some examples, the first resources are exclusive of third resources which a third UE has allocated for a fourth sidelink message to a fourth UE. In some examples, the second resources are selected from the first resources. In some examples, the first resources include third resources which a third UE has allocated for a fourth sidelink message to a fourth UE. In some examples, the second resources are exclusive of the first resources. In some examples, the third sidelink message is transmitted via a sidelink control channel.

Additionally, or alternatively, the communications manager 920 may support wireless communication at a first UE in accordance with examples as disclosed herein. The data identifier 940 may be configured as or otherwise support a means for identifying data for transmission to a second UE over a sidelink channel. In some examples, the sidelink message receiver 925 may be configured as or otherwise support a means for receiving a first sidelink message (e.g., a sidelink message 922) from a third UE, the first sidelink message including an indication of first resources reserved by a fourth UE for a second sidelink message by the fourth UE to the third UE. In some examples, the resource identification component 935 may be configured as or otherwise support a means for identifying second resources of the sidelink channel based on the indication of the first resources reserved by the fourth UE. In some examples, the resource identification component 935 may receive an indication of the first resources 937 from the sidelink message receiver 925. In some examples, the sidelink message transmitter 930 may be configured as or otherwise support a means for transmitting a third sidelink message including the data to the second UE over the second resources. In some examples, the sidelink message transmitter 930 may receive an indication of the second resources 938 from the resource identification component 935. In some examples, the sidelink message transmitter 930 may receive the data 942 from the data identifier 940.

In some examples, the first sidelink message is received via a sidelink feedback channel. In some examples, the sidelink message receiver 925 may be configured as or otherwise support a means for monitoring for one or more sidelink messages (e.g., sidelink messages 922) among a set of UEs, over a beam selected for the transmission of the identified data, the set of UEs including the second UE, where receiving the first sidelink message (e.g., a sidelink message 922) is based on the monitoring. In some examples, the sensing window identifier 975 may be configured as or otherwise support a means for identifying a sensing window including a set of time and frequency resources associated with the one or more sidelink messages, where the monitoring is based on the identified sensing window. For instance, the sidelink message receiver 925 may receive an indication of the identified sensing window 977 from sidelink message receiver 925.

In some examples, the reservation parameter component 950 may be configured as or otherwise support a means for identifying a set of reservation parameters associated with the first resources based on the indication of the first resources, where identifying the second resources of the sidelink channel is based on the identified set of reservation parameters. In some examples, reservation parameter component 950 may receive an indication of the first resources 929 from sidelink message receiver 925. In some examples, the reservation parameter component 950 may be configured as or otherwise support a means for identifying reservation information associated with the first resources based on the set of reservation parameters, the reservation information including a duration associated with a reservation of the first resources, a periodicity associated with the reservation of the first resources, a quantity of reservations of the first resources, time and frequency information associated with the first resources, or a combination thereof, where identifying the second resources of the sidelink channel is based on the identified reservation information. In some examples, resource identification component 935 may receive an indication 952 from the reservation parameter component 950 that indicates the identified set of reservation parameters and/or the identified reservation information.

In some examples, the priority information component 955 may be configured as or otherwise support a means for identifying first priority information associated with the second sidelink message based on the indication of the first resources, where identifying the second resources of the sidelink channel is based on the identified first priority information. In some examples, priority information component 955 may receive an indication of the first resources 926 from sidelink message receiver 925. In some examples, the resource identification component 935 may receive an indication of the identified first priority information 958 from priority information component 955. In some examples, the priority information component 955 may be configured as or otherwise support a means for identifying second priority information associated with transmitting the third sidelink message, where identifying the second resources of the sidelink channel is based on comparing the identified first priority information and the identified second priority information. In some examples, the measuring component 960 may be configured as or otherwise support a means for measuring a reference signal received power value associated with the first sidelink message, where identifying the second resources of the sidelink channel is based on the measured reference signal received power value. In some examples, measuring component 960 may receive an indication of the first sidelink message 928 from the sidelink message receiver 925. In some examples, resource identification component 935 may receive an indication 962 of the measured reference signal received power value from measuring component 960.

In some examples, the priority information component 955 may be configured as or otherwise support a means for determining first priority information associated with the second sidelink message based on the indication of the first resources. In some examples, the measuring component 960 may be configured as or otherwise support a means for determining an interference threshold value associated with the second sidelink message based on the first priority information associated with the second sidelink message and second priority information associated with transmitting the third sidelink message, where identifying the second resources of the sidelink channel is based on the measured reference signal received power value satisfying the interference threshold value. In some examples, the measuring component 960 may receive an indication 957 of the first priority information and/or the second priority information from the priority information component 955.

In some examples, the second sidelink message includes a sidelink data transmission to the second UE. In some examples, the indication of the first resources includes a set of available resources exclusive of the first resources. In some examples, identifying the second resources includes identifying the second resources from among the set of available resources. In some examples, identifying the second resources includes identifying the second resources exclusive of the first resources. In some examples, the first sidelink message is received via a sidelink control channel, a sidelink data channel, or both. In some examples, the first resources included in the indication are reserved by a third UE. In some examples, the third sidelink message including the identified data is transmitted to a fourth UE.

In some examples, the resource parameter component 965 may be configured as or otherwise support a means for identifying a set of resource parameters associated with the first resources based on the indication of the first resources, where identifying the second resources of the sidelink channel is based on the identified set of resource parameters. In some examples, the resource parameter component 965 may receive an indication of the first resources 967 from sidelink message receiver 925. In some examples, the resource parameter component 965 may be configured as or otherwise support a means for identifying resource information associated with the first resources based on the set of resource parameters, the resource information including a periodicity associated with the first resources, time and frequency information associated with the first resources, priority information associated with the second sidelink message, or a combination thereof, where identifying the second resources of the sidelink channel is based on the identified resource information. In some examples, the resource identification component 935 may receive an indication 968 of the identified set of resource parameters and/or the identified resource information from resource parameter component 965.

In some examples, the transmit power component 970 may be configured as or otherwise support a means for identifying a transmit power value associated with the first sidelink message based on the first sidelink message, where identifying the second resources of the sidelink channel is based on the identified transmit power value. In some examples, transmit power component 970 may receive an indication of the first sidelink message 973 from sidelink message receiver 925. In some examples, the resource identification component may receive an indication of the identified transmit power value 974. In some examples, the priority information component 955 may be configured as or otherwise support a means for determining first priority information associated with the second sidelink message based on the indication of the first resources. In some examples, the measuring component 960 may be configured as or otherwise support a means for determining an interference threshold value associated with the second sidelink message based on the first priority information associated with the second sidelink message and second priority information associated with transmitting the third sidelink message, where identifying the second resources of the sidelink channel is based on the transmit power value satisfying the interference threshold value. In some examples, the resource identification component 935 may receive an indication 962 of the identified interference threshold value.

Additionally, or alternatively, the communications manager 920 may support wireless communication at a first UE in accordance with examples as disclosed herein. In some examples, the sidelink message receiver 925 may be configured as or otherwise support a means for receiving a first sidelink message (e.g., a sidelink message 922) including an indication of first resources reserved for a second sidelink message to the first UE. In some examples, the sidelink message receiver 925 may be configured as or otherwise support a means for receiving the second sidelink message (e.g., a sidelink message 922) over the first resources, the second sidelink message including data. In some examples, the sidelink message transmitter 930 may be configured as or otherwise support a means for transmitting a third sidelink message (e.g., a sidelink message 932) to a second UE based on the first sidelink message, the third sidelink message including the indication of the first resources reserved for the second sidelink message. In some examples, the third sidelink message is transmitted via a sidelink feedback channel. In some examples, the first resources included in the indication are reserved by a third UE.

In some examples, the priority information component 955 may be configured as or otherwise support a means for identifying priority information associated with receiving the second sidelink message based on the first sidelink message. In some examples, the priority information component 955 may receive an indication 926 of the first sidelink message from sidelink message receiver 925. In some examples, the measuring component 960 may be configured as or otherwise support a means for setting, based on the priority information, an interference threshold value associated with receiving one or more sidelink messages, the one or more sidelink messages including the second sidelink message. In some examples, the measuring component may receive an indication 957 of the priority information from priority information component 955. In some examples, the priority information component 955 may be configured as or otherwise support a means for identifying priority information associated with receiving the second sidelink message from the second UE based on the first sidelink message. In some examples, priority information component 955 may receive an indication 926 of the second sidelink message from sidelink message receiver 925. In some examples, the transmit power component 970 may be configured as or otherwise support a means for setting, based on the priority information, a transmit power value associated with transmitting the third sidelink message, where transmitting the third sidelink message is based on the transmit power value. In some examples, transmit power component 970 may receive an indication 959 of the priority information from priority information component 955. In some examples, sidelink message transmitter 930 may receive an indication 972 of the transmit power value from transmit power component 970.

In some examples, the first sidelink message is transmitted via a sidelink control channel. In some examples, the third sidelink message is transmitted via a sidelink control channel, a sidelink data channel, or both. In some examples, the priority information component 955 may be configured as or otherwise support a means for identifying priority information associated with receiving the second sidelink message based on the first sidelink message. In some examples, the transmit power component 970 may be configured as or otherwise support a means for setting, based on the priority information, a transmit power value associated with transmitting the third sidelink message, where the third sidelink message includes an indication of the transmit power value. In some examples, the priority information component 955 may be configured as or otherwise support a means for identifying priority information associated with receiving the second sidelink message based on the first sidelink message. In some examples, the measuring component 960 may be configured as or otherwise support a means for setting, based on the priority information, an interference threshold value associated with receiving one or more sidelink messages, the one or more sidelink messages including the second sidelink message, where the third sidelink message includes an indication of the interference threshold value. In some examples, the sidelink message transmitter 930 may receive an indication of the interference threshold value from measuring component 960.

Figure 10:
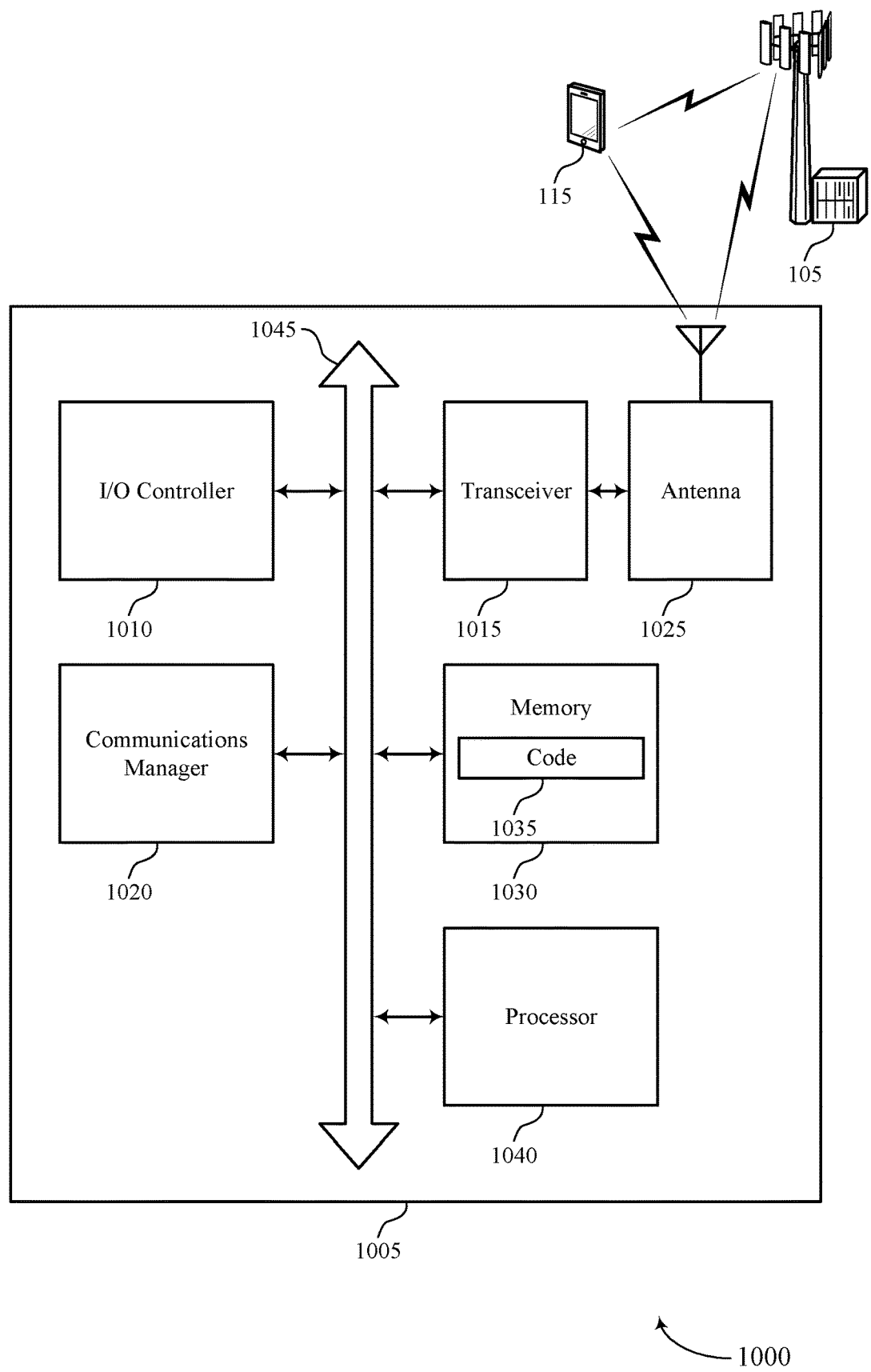
FIG. 10 shows a diagram of a system including a device that supports resource selection with sidelink receiver sensing and sidelink transmitter sensing in accordance with aspects of the present disclosure.

FIG. 10 shows a diagram of a system 1000 including a device 1005 that supports resource selection with sidelink receiver sensing and sidelink transmitter sensing in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting resource selection with sidelink receiver sensing). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for receiving a first sidelink message over a sidelink channel, the first sidelink message including an indication of first resources of the sidelink channel reserved for a second sidelink message. The communications manager 1020 may be configured as or otherwise support a means for transmitting, to a second UE, a third sidelink message over the sidelink channel, the third sidelink message including an indication of second resources of the sidelink channel. The communications manager 1020 may be configured as or otherwise support a means for receiving, from the second UE, a fourth sidelink message over third resources of the sidelink channel based on transmitting the third sidelink message to the second UE, the fourth sidelink message including data for the first UE.

Additionally, or alternatively, the communications manager 1020 may support wireless communication at a first UE in accordance with examples as disclosed herein. For example, the communications manager 1020 may be configured as or otherwise support a means for receiving, from a second UE, a first sidelink message over a sidelink channel, the first sidelink message including an indication of first resources of the sidelink channel. The communications manager 1020 may be configured as or otherwise support a means for selecting second resources of the sidelink channel for a second sidelink message to the second UE based on the first resources. The communications manager 1020 may be configured as or otherwise support a means for transmitting, to the second UE, a third sidelink message over the sidelink channel, where the third sidelink message allocates the second resources for the second sidelink message to the second UE. The communications manager 1020 may be configured as or otherwise support a means for transmitting, to the second UE, the second sidelink message over the second resources, where the second sidelink message includes data for the second UE.

Additionally, or alternatively, the communications manager 1020 may support wireless communication at a first UE in accordance with examples as disclosed herein. For example, the communications manager 1020 may be configured as or otherwise support a means for identifying data for transmission over a sidelink channel. The communications manager 1020 may be configured as or otherwise support a means for receiving a first sidelink message from a second UE, the first sidelink message including an indication of first resources for a second sidelink message to the second UE. The communications manager 1020 may be configured as or otherwise support a means for identifying second resources of the sidelink channel based on the first resources. The communications manager 1020 may be configured as or otherwise support a means for transmitting a third sidelink message including the data over the second resources.

Additionally, or alternatively, the communications manager 1020 may support wireless communication at a first UE in accordance with examples as disclosed herein. For example, the communications manager 1020 may be configured as or otherwise support a means for receiving a first sidelink message including an indication of first resources reserved for a second sidelink message to the first UE. The communications manager 1020 may be configured as or otherwise support a means for receiving the second sidelink message over the first resources, the second sidelink message including data. The communications manager 1020 may be configured as or otherwise support a means for transmitting a third sidelink message to a second UE based on the first sidelink message, the third sidelink message including the indication of the first resources reserved for the second sidelink message.

By including or configuring the communications manager 1020 in accordance with examples as described herein, the device 1005 may support techniques for enabling a transmitting UE to identify resources reserved for transmissions of neighboring UEs when the transmitting UE uses a beam configured in a direction different from which the transmissions of neighboring UEs are to be received. Accordingly, the transmitting UE may make determinations corresponding to resources that the transmitting UE uses to perform transmission relative to the resources of the neighboring UEs.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of resource selection with sidelink receiver sensing as described herein, or the processor 1040 and the memory 1030 may be otherwise configured to perform or support such operations.

Figure 11:
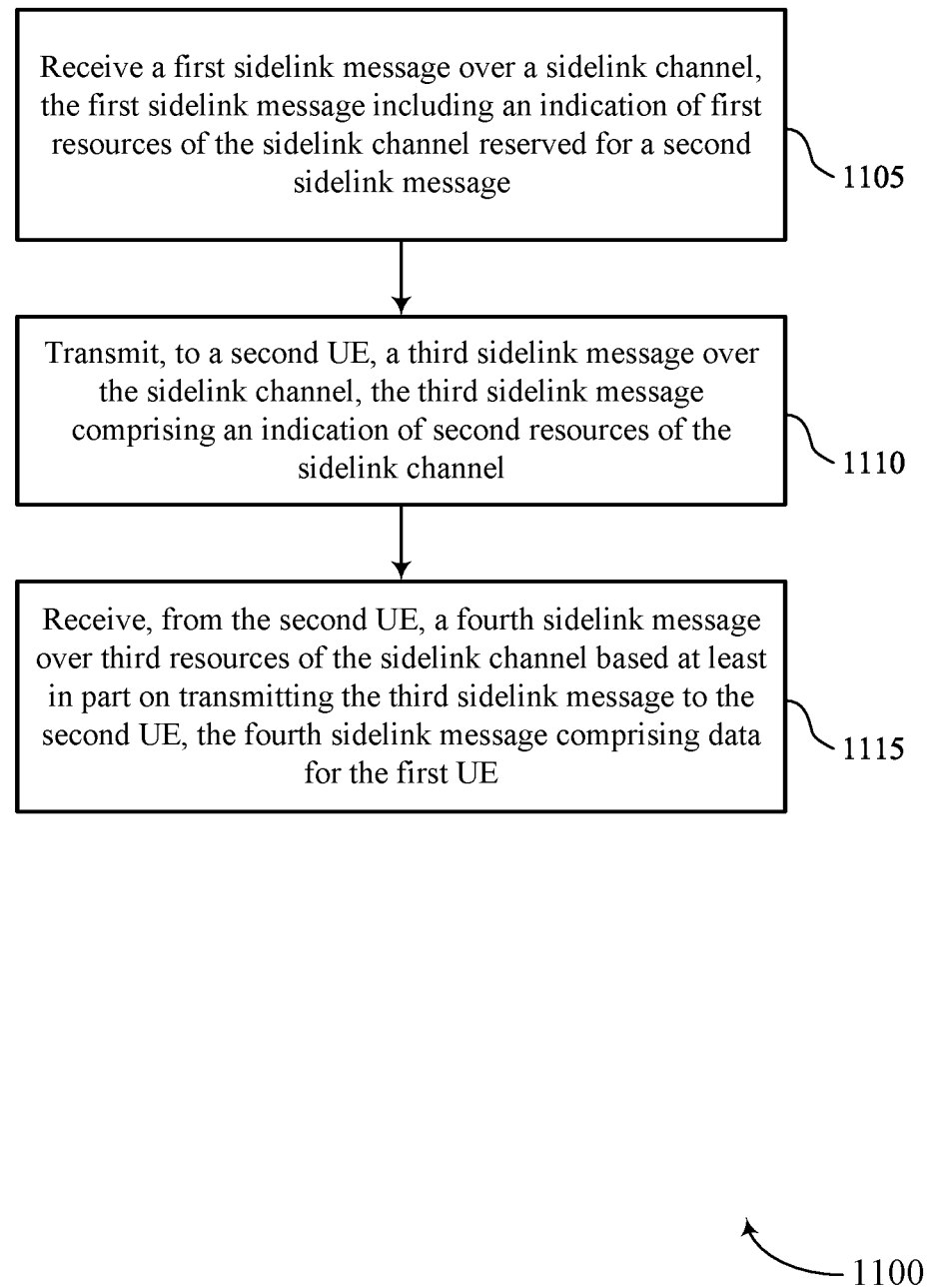
FIGS. 11 through 15 show flowcharts illustrating methods that support resource selection with sidelink receiver sensing and sidelink transmitter sensing in accordance with aspects of the present disclosure.

FIG. 11 shows a flowchart illustrating a method 1100 that supports resource selection with sidelink receiver sensing in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving a first sidelink message over a sidelink channel, the first sidelink message including an indication of first resources of the sidelink channel reserved for a second sidelink message. The operations of 1105 may be performed in accordance with examples as disclosed herein. In some examples, aspects of the operations of 1105 may be performed by a sidelink message receiver 925 as described with reference to FIG. 9.

At 1110, the method may include transmitting, to a second UE, a third sidelink message over the sidelink channel, the third sidelink message including an indication of second resources of the sidelink channel. The operations of 1110 may be performed in accordance with examples as disclosed herein. In some examples, aspects of the operations of 1110 may be performed by a sidelink message transmitter 930 as described with reference to FIG. 9.

At 1115, the method may include receiving, from the second UE, a fourth sidelink message over third resources of the sidelink channel based on transmitting the third sidelink message to the second UE, the fourth sidelink message including data for the first UE. The operations of 1115 may be performed in accordance with examples as disclosed herein. In some examples, aspects of the operations of 1115 may be performed by a sidelink message receiver 925 as described with reference to FIG. 9.

Figure 12:
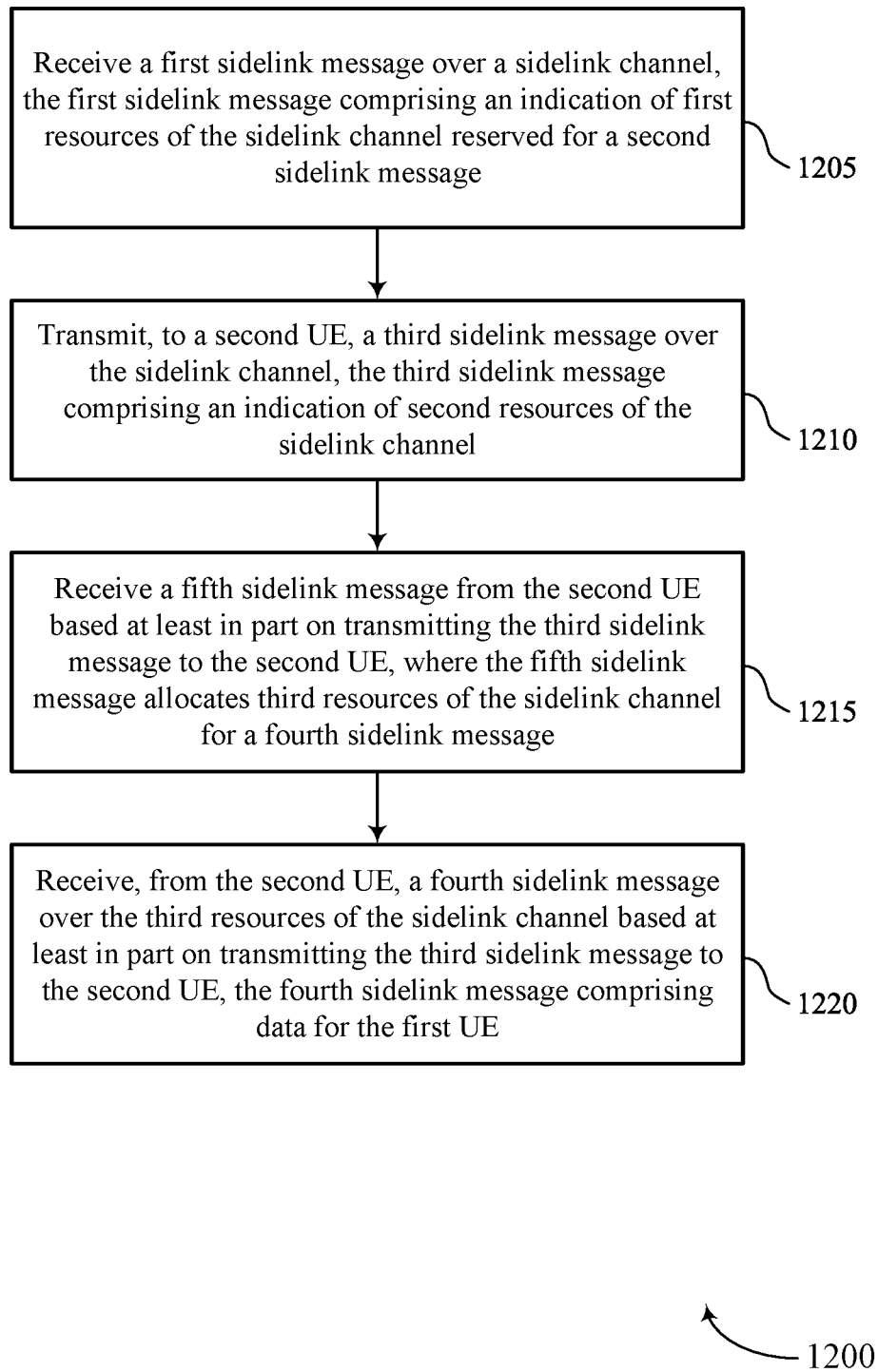

FIG. 12 shows a flowchart illustrating a method 1200 that supports resource selection with sidelink receiver sensing in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving a first sidelink message over a sidelink channel, the first sidelink message including an indication of first resources of the sidelink channel reserved for a second sidelink message. The operations of 1205 may be performed in accordance with examples as disclosed herein. In some examples, aspects of the operations of 1205 may be performed by a sidelink message receiver 925 as described with reference to FIG. 9.

At 1210, the method may include transmitting, to a second UE, a third sidelink message over the sidelink channel, the third sidelink message including an indication of second resources of the sidelink channel. The operations of 1210 may be performed in accordance with examples as disclosed herein. In some examples, aspects of the operations of 1210 may be performed by a sidelink message transmitter 930 as described with reference to FIG. 9.

At 1215, the method may include receiving a fifth sidelink message from the second UE based at least in part on transmitting the third sidelink message to the second UE, where the fifth sidelink message allocates third resources of the sidelink channel for a fourth sidelink message. The operations of 1215 may be performed in accordance with examples as disclosed herein. In some examples, aspects of the operations of 1215 may be performed by a sidelink message receiver 925 as described with reference to FIG. 9.

At 1220, the method may include receiving, from the second UE, a fourth sidelink message over the third resources of the sidelink channel based at least in part on transmitting the third sidelink message to the second UE, the fourth sidelink message comprising data for the first UE. The operations of 1220 may be performed in accordance with examples as disclosed herein. In some examples, aspects of the operations of 1220 may be performed by a sidelink message receiver 925 as described with reference to FIG. 9.

Figure 13:
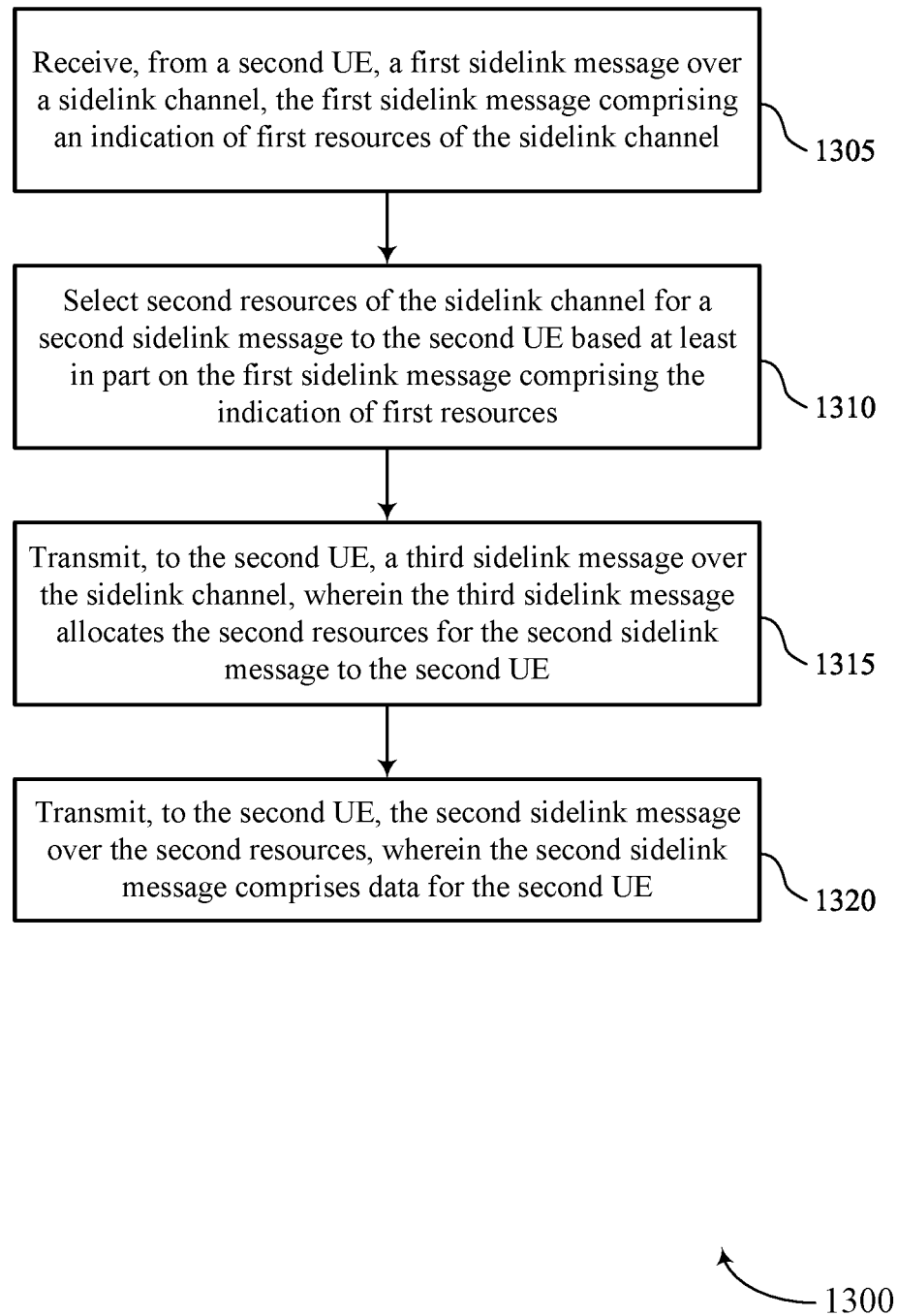

FIG. 13 shows a flowchart illustrating a method 1300 that supports resource selection with sidelink receiver sensing in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include receiving, from a second UE, a first sidelink message over a sidelink channel, the first sidelink message including an indication of first resources of the sidelink channel. The operations of 1305 may be performed in accordance with examples as disclosed herein. In some examples, aspects of the operations of 1305 may be performed by a sidelink message receiver 925 as described with reference to FIG. 9.

At 1310, the method may include selecting second resources of the sidelink channel for a second sidelink message to the second UE based on the first sidelink message including the indication of first resources. The operations of 1310 may be performed in accordance with examples as disclosed herein. In some examples, aspects of the operations of 1310 may be performed by a resource identification component 935 as described with reference to FIG. 9.

At 1315, the method may include transmitting, to the second UE, a third sidelink message over the sidelink channel, where the third sidelink message allocates the second resources for the second sidelink message to the second UE. The operations of 1315 may be performed in accordance with examples as disclosed herein. In some examples, aspects of the operations of 1315 may be performed by a sidelink message transmitter 930 as described with reference to FIG. 9.

At 1320, the method may include transmitting, to the second UE, the second sidelink message over the second resources, where the second sidelink message includes data for the second UE. The operations of 1320 may be performed in accordance with examples as disclosed herein. In some examples, aspects of the operations of 1320 may be performed by a sidelink message transmitter 930 as described with reference to FIG. 9.

Figure 14:
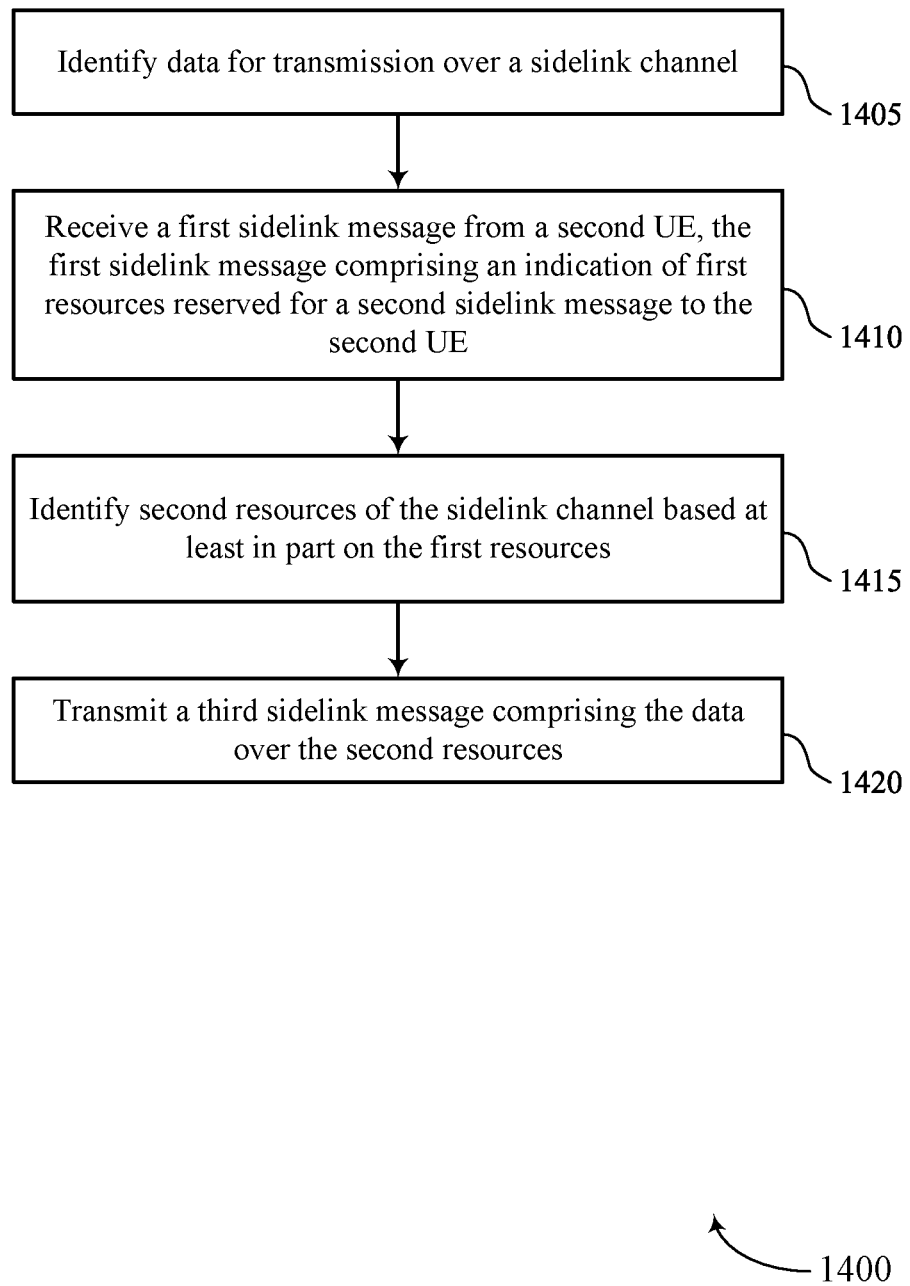

FIG. 14 shows a flowchart illustrating a method 1400 that supports resource selection with sidelink transmitter sensing in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include identifying data for transmission over a sidelink channel. The operations of 1405 may be performed in accordance with examples as disclosed herein. In some examples, aspects of the operations of 1405 may be performed by a data identifier 940 as described with reference to FIG. 9.

At 1410, the method may include receiving a first sidelink message from a second UE, the first sidelink message including an indication of first resources reserved for a second sidelink message to the second UE. The operations of 1410 may be performed in accordance with examples as disclosed herein. In some examples, aspects of the operations of 1410 may be performed by a sidelink message receiver 925 as described with reference to FIG. 9.

At 1415, the method may include identifying second resources of the sidelink channel based on the first resources. The operations of 1415 may be performed in accordance with examples as disclosed herein. In some examples, aspects of the operations of 1415 may be performed by a resource identification component 935 as described with reference to FIG. 9.

At 1420, the method may include transmitting a third sidelink message including the data over the second resources. The operations of 1420 may be performed in accordance with examples as disclosed herein. In some examples, aspects of the operations of 1420 may be performed by a sidelink message transmitter 930 as described with reference to FIG. 9.

Figure 15:
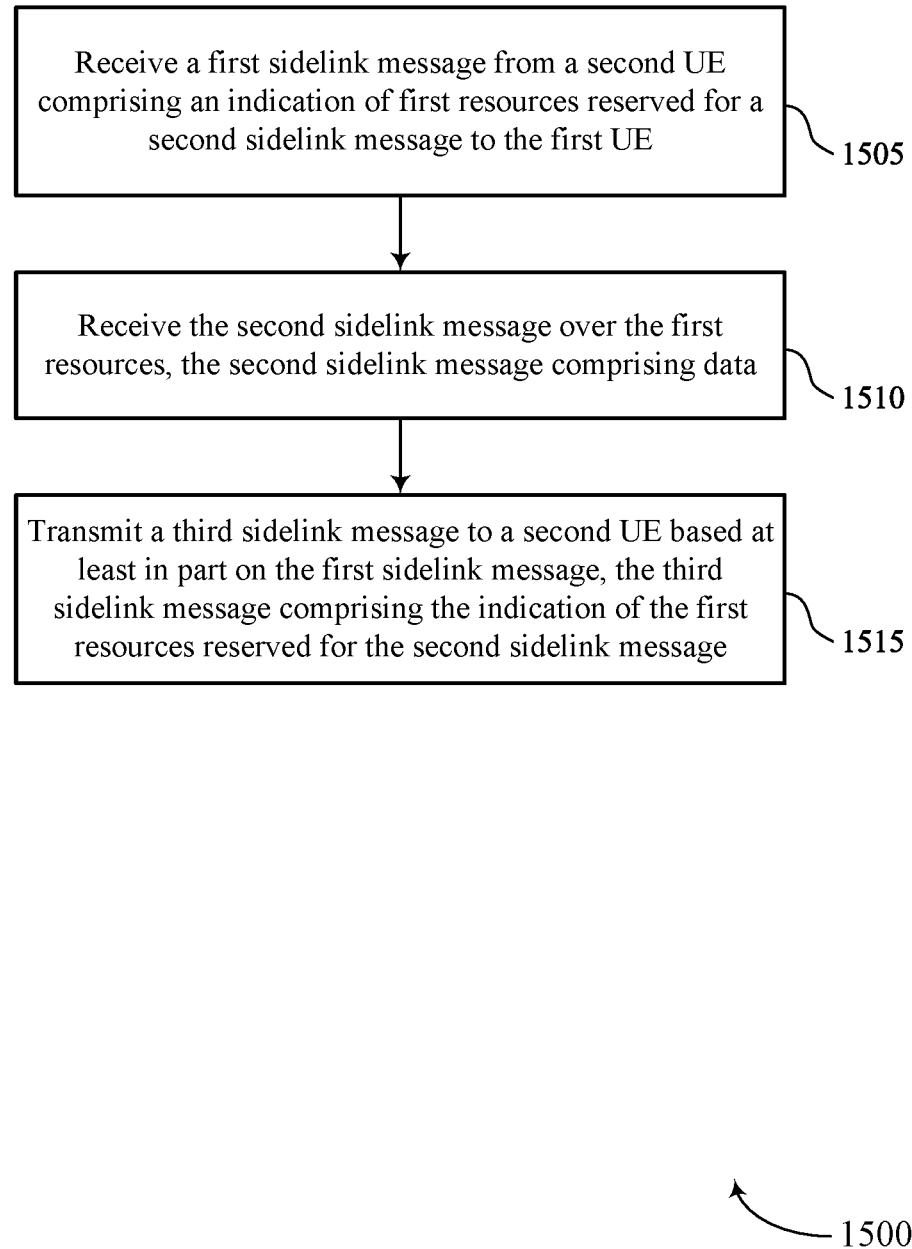

FIG. 15 shows a flowchart illustrating a method 1500 that supports resource selection with sidelink transmitter sensing in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a first sidelink message from a second UE including an indication of first resources reserved for a second sidelink message to the first UE. The operations of 1505 may be performed in accordance with examples as disclosed herein. In some examples, aspects of the operations of 1505 may be performed by a sidelink message receiver 925 as described with reference to FIG. 9.

At 1510, the method may include receiving the second sidelink message from the second UE, the second sidelink message including data. The operations of 1510 may be performed in accordance with examples as disclosed herein. In some examples, aspects of the operations of 1510 may be performed by a sidelink message receiver 925 as described with reference to FIG. 9.

At 1515, the method may include transmitting a third sidelink message to a second UE based on the first sidelink message, the third sidelink message including the indication of the first resources reserved for the second sidelink message. The operations of 1515 may be performed in accordance with examples as disclosed herein. In some examples, aspects of the operations of 1515 may be performed by a sidelink message transmitter 930 as described with reference to FIG. 9.

The following provides an overview of aspects of the present disclosure:

Aspect 1: A method for wireless communication at a first UE, comprising: receiving a first sidelink message over a sidelink channel, the first sidelink message comprising an indication of first resources of the sidelink channel reserved for a second sidelink message; transmitting, to a second UE, a third sidelink message over the sidelink channel, the third sidelink message comprising an indication of second resources of the sidelink channel; and receiving, from the second UE, a fourth sidelink message over third resources of the sidelink channel based at least in part on transmitting the third sidelink message to the second UE, the fourth sidelink message comprising data for the first UE.

Aspect 2: The method of aspect 1, further comprising: receiving a fifth sidelink message from the second UE based at least in part on transmitting the third sidelink message to the second UE, wherein the fifth sidelink message allocates the third resources of the sidelink channel for the fourth sidelink message.

Aspect 3: The method of aspect 2, wherein. the second resources of the sidelink channel are exclusive of the first resources of the sidelink channel, and the third resources are selected from the second resources Aspect 4: The method of aspect 3, wherein the fifth sidelink message is transmitted via a sidelink control channel.

Aspect 5: The method of any of aspects 2 through 4, wherein. the second resources of the sidelink channel comprise the first resources of the sidelink channel, and the third resources are exclusive of the second resources Aspect 6: The method of any of aspects 1 through 5, further comprising: determining availability of the first resources for inclusion in the third resources based at least in part on comparing a signal metric of the first sidelink message or the second sidelink message to a threshold.

Aspect 7: The method of aspect 6, further comprising: determining the threshold based at least in part on a priority of the second sidelink message, a priority of the fourth sidelink message, or a combination thereof.

Aspect 8: The method of aspect 7, wherein the second resources indicate that the first resources are available for inclusion in the third resources based at least in part on the signal metric not satisfying the threshold.

Aspect 9: The method of any of aspects 7 through 8, wherein the second resources indicate that the first resources are not available for inclusion in the third resources based at least in part on the signal metric satisfying the threshold.

Aspect 10: The method of any of aspects 1 through 9, wherein. the third sidelink message is associated with a time window, and the second resources indicate available resources for the fourth sidelink message within the time window Aspect 11: The method of aspect 10, wherein the first resources comprise a set of periodic resources and the second resources indicate resources exclusive of each of the set of periodic resources occurring within the time window.

Aspect 12: The method of any of aspects 1 through 11, wherein the first sidelink message comprises sidelink control information comprising the indication of the first resources.

Aspect 13: A method for wireless communication at a first UE, comprising: receiving, from a second UE, a first sidelink message over a sidelink channel, the first sidelink message comprising an indication of first resources of the sidelink channel; selecting second resources of the sidelink channel for a second sidelink message to the second UE based at least in part on the first resources; transmitting, to the second UE, a third sidelink message over the sidelink channel, wherein the third sidelink message allocates the second resources for the second sidelink message to the second UE; and transmitting, to the second UE, the second sidelink message over the second resources, wherein the second sidelink message comprises data for the second UE.

Aspect 14: The method of aspect 13, wherein. the first resources are exclusive of third resources which a third UE has allocated for a fourth sidelink message to a fourth UE, and the second resources are selected from the first resources Aspect 15: The method of any of aspects 13 through 14, wherein. the first resources comprise third resources which a third UE has allocated for a fourth sidelink message to a fourth UE, and wherein the second resources are exclusive of the first resources Aspect 16: The method of any of aspects 13 through 15, wherein the third sidelink message is transmitted via a sidelink control channel.

Aspect 17: A method for wireless communication at a first UE, comprising: identifying data for transmission over a sidelink channel; receiving a first sidelink message from a second UE, the first sidelink message comprising an indication of first resources reserved for a second sidelink message to the second UE; identifying second resources of the sidelink channel based at least in part on the first resources; and transmitting a third sidelink message comprising the identified data over the second resources.

Aspect 18: The method of aspect 17, wherein the first sidelink message is received via a sidelink feedback channel.

Aspect 19: The method of any of aspects 17 through 18, further comprising: monitoring for one or more sidelink messages among a set of UEs, over a beam selected for the transmission of the identified data, the set of UEs comprising the second UE, wherein receiving the first sidelink message is based at least in part on the monitoring, wherein the second UE receives the third message and the fourth UE reserves the second resources.

Aspect 20: The method of aspect 19, further comprising: identifying a sensing window comprising a set of time and frequency resources associated with the one or more sidelink messages, wherein the monitoring is based at least in part on the identified sensing window.

Aspect 21: The method of any of aspects 17 through 20, further comprising: identifying a set of reservation parameters associated with the first resources based at least in part on the indication of the first resources, wherein identifying the second resources of the sidelink channel is based at least in part on the identified set of reservation parameters.

Aspect 22: The method of aspect 21, further comprising: identifying reservation information associated with the first resources based at least in part on the set of reservation parameters, the identified reservation information comprising a duration associated with a reservation of the first resources, a periodicity associated with the reservation of the first resources, a quantity of reservations of the first resources, time and frequency information associated with the first resources, or a combination thereof, wherein identifying the second resources of the sidelink channel is based at least in part on the identified reservation information.

Aspect 23: The method of any of aspects 17 through 22, further comprising: identifying first priority information associated with the second sidelink message based at least in part on the indication of the first resources, wherein identifying the second resources of the sidelink channel is based at least in part on the identified first priority information.

Aspect 24: The method of aspect 23, further comprising: identifying second priority information associated with transmitting the third sidelink message, wherein identifying the second resources of the sidelink channel is based at least in part on comparing the identified first priority information and the identified second priority information.

Aspect 25: The method of any of aspects 17 through 24, further comprising: measuring a reference signal received power value associated with the first sidelink message, wherein identifying the second resources of the sidelink channel is based at least in part on the measured reference signal received power value.

Aspect 26: The method of aspect 25, further comprising: determining first priority information associated with the second sidelink message based at least in part on the indication of the first resources; and determining an interference threshold value associated with the second sidelink message based at least in part on the first priority information associated with the second sidelink message and second priority information associated with transmitting the third sidelink message, wherein identifying the second resources of the sidelink channel is based at least in part on the measured reference signal received power value satisfying the interference threshold value.

Aspect 27: The method of any of aspects 17 through 26, wherein the second sidelink message comprises a sidelink data transmission to the second UE.

Aspect 28: The method of any of aspects 17 through 27, wherein. the indication of the first resources comprises a set of available resources exclusive of the first resources, and identifying the second resources comprises identifying the second resources from among the set of available resources Aspect 29: The method of any of aspects 17 through 28, wherein identifying the second resources comprises identifying the second resources exclusive of the first resources.

Aspect 30: The method of any of aspects 17 through 29, wherein the first sidelink message is received via a sidelink control channel, a sidelink data channel, or both.

Aspect 31: The method of any of aspects 17 through 30, further comprising: identifying a set of resource parameters associated with the first resources based at least in part on the indication of the first resources, wherein identifying the second resources of the sidelink channel is based at least in part on the identified set of resource parameters.

Aspect 32: The method of aspect 31, further comprising: identifying resource information associated with the first resources based at least in part on the identified set of resource parameters, the identified resource information comprising a periodicity associated with the first resources, time and frequency information associated with the first resources, priority information associated with the second sidelink message, or a combination thereof, wherein identifying the second resources of the sidelink channel is based at least in part on the identified resource information.

Aspect 33: The method of any of aspects 17 through 32, further comprising: identifying a transmit power value associated with the first sidelink message based at least in part on the first sidelink message, wherein identifying the second resources of the sidelink channel is based at least in part on the identified transmit power value.

Aspect 34: The method of aspect 33, further comprising: determining first priority information associated with the second sidelink message based at least in part on the indication of the first resources; and determining an interference threshold value associated with the second sidelink message based at least in part on the first priority information associated with the second sidelink message and second priority information associated with transmitting the third sidelink message, wherein identifying the second resources of the sidelink channel is based at least in part on the transmit power value satisfying the interference threshold value.

Aspect 35: The method of any of aspects 17 through 34, wherein. the first resources included in the indication are reserved by a third UE; and the third sidelink message comprising the identified data is transmitted to a fourth UE Aspect 36: The method of any of aspects 17 through 35, wherein the first resources included in the indication are reserved by a third UE.

Aspect 37: A method for wireless communication at a first UE, the method comprising: receiving a first sidelink message comprising an indication of first resources reserved for a second sidelink message to the first UE; receiving the second sidelink message over the first resources, the second sidelink message comprising data; and transmitting a third sidelink message to a second UE based at least in part on the first sidelink message, the third sidelink message comprising the indication of the first resources reserved for the second sidelink message.

Aspect 38: The method of aspect 37, wherein the third sidelink message is transmitted via a sidelink feedback channel.

Aspect 39: The method of any of aspects 37 through 38, further comprising: identifying priority information associated with receiving the second sidelink message based at least in part on the first sidelink message; and setting, based at least in part on the identified priority information, an interference threshold value associated with receiving one or more sidelink messages, the one or more sidelink messages comprising the second sidelink message.

Aspect 40: The method of any of aspects 37 through 39, further comprising: identifying priority information associated with receiving the second sidelink message based at least in part on the first sidelink message; setting, based at least in part on the identified priority information, a transmit power value associated with transmitting the third sidelink message, wherein transmitting the third sidelink message is based at least in part on the transmit power value.

Aspect 41: The method of any of aspects 37 through 40, wherein the first sidelink message is transmitted via a sidelink control channel.

Aspect 42: The method of any of aspects 37 through 41, wherein the third sidelink message is transmitted via a sidelink control channel, a sidelink data channel, or both.

Aspect 43: The method of any of aspects 37 through 42, further comprising: identifying priority information associated with receiving the second sidelink message based at least in part on the first sidelink message; and setting, based at least in part on the identified priority information, a transmit power value associated with transmitting the third sidelink message, wherein the third sidelink message comprises an indication of the transmit power value.

Aspect 44: The method of any of aspects 37 through 43, further comprising: identifying priority information associated with receiving the second sidelink message based at least in part on the first sidelink message; setting, based at least in part on the identified priority information, an interference threshold value associated with receiving one or more sidelink messages, the one or more sidelink messages comprising the second sidelink message, wherein the third sidelink message comprises an indication of the interference threshold value.

Aspect 45: An apparatus for wireless communication at a first UE, comprising a processor; memory coupled with the processor; and instructions stored in the memory and executable by the processor to cause the apparatus to perform a method of any of aspects 1 through 12.

Aspect 46: An apparatus for wireless communication at a first UE, comprising at least one means for performing a method of any of aspects 1 through 12.

Aspect 47: A non-transitory computer-readable medium storing code for wireless communication at a first UE, the code comprising instructions executable by a processor to perform a method of any of aspects 1 through 12.

Aspect 48: An apparatus for wireless communication at a first UE, comprising a processor; memory coupled with the processor; and instructions stored in the memory and executable by the processor to cause the apparatus to perform a method of any of aspects 13 through 16.

Aspect 49: An apparatus for wireless communication at a first UE, comprising at least one means for performing a method of any of aspects 13 through 16.

Aspect 50: A non-transitory computer-readable medium storing code for wireless communication at a first UE, the code comprising instructions executable by a processor to perform a method of any of aspects 13 through 16.

Aspect 51: An apparatus for wireless communication at a first UE, comprising a processor; memory coupled with the processor; and instructions stored in the memory and executable by the processor to cause the apparatus to perform a method of any of aspects 17 through 36.

Aspect 52: An apparatus for wireless communication at a first UE, comprising at least one means for performing a method of any of aspects 17 through 36.

Aspect 53: A non-transitory computer-readable medium storing code for wireless communication at a first UE, the code comprising instructions executable by a processor to perform a method of any of aspects 17 through 36.

Aspect 54: An apparatus for wireless communication at a first UE, comprising a processor; memory coupled with the processor; and instructions stored in the memory and executable by the processor to cause the apparatus to perform a method of any of aspects 37 through 44.

Aspect 55: An apparatus for wireless communication at a first UE, comprising at least one means for performing a method of any of aspects 37 through 44.

Aspect 56: A non-transitory computer-readable medium storing code for wireless communication at a first UE, the code comprising instructions executable by a processor to perform a method of any of aspects 37 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving a first sidelink message over a sidelink channel, the first sidelink message comprising an indication of first resources of the sidelink channel reserved for a fifth sidelink message to a third UE;
   transmitting, to a second UE, a second sidelink message over the sidelink channel, the second sidelink message comprising an indication of second resources of the sidelink channel, wherein the second sidelink message indicates that the second resources are available for selection by the second UE for a fourth sidelink message to the first UE or not available for selection by the second UE for the fourth sidelink message;
   receiving a third sidelink message from the second UE based at least in part on transmitting the second sidelink message to the second UE, wherein the third sidelink message allocates third resources of the sidelink channel for the fourth sidelink message; and
   receiving, from the second UE, the fourth sidelink message over the third resources of the sidelink channel reserved by the second UE based at least in part on transmitting the second sidelink message to the second UE, the fourth sidelink message comprising data for the first UE.

2. The method of claim 1, wherein
   the second resources of the sidelink channel are exclusive of the first resources of the sidelink channel, and
   the third resources are selected from the second resources.

3. The method of claim 2, wherein the third sidelink message is transmitted via a sidelink control channel.

4. The method of claim 1, wherein
   the second resources of the sidelink channel comprise the first resources of the sidelink channel, and
   the third resources are exclusive of the second resources.

5. The method of claim 1, wherein
   the second sidelink message is associated with a time window, and
   the second resources indicate available resources for the fourth sidelink message within the time window.

6. The method of claim 5, wherein the first resources comprise a set of periodic resources and the second resources indicate resources exclusive of each of the set of periodic resources occurring within the time window.

7. The method of claim 1, wherein the first sidelink message comprises sidelink control information comprising the indication of the first resources.

8. A method for wireless communication at a first user equipment (UE), comprising:
   receiving, from a second UE, a second sidelink message over a sidelink channel, the second sidelink message comprising an indication of first resources of the sidelink channel, wherein the second sidelink message indicates that the first resources are available for selection by the first UE for a fourth sidelink message to the second UE or not available for selection by the first UE for the fourth sidelink message;
   selecting second resources of the sidelink channel for the fourth sidelink message to the second UE based at least in part on the first resources and the indication that the first resources are available for selection by the first UE for the fourth sidelink message or not available for selection by the first UE for the fourth sidelink message;
   transmitting, to the second UE, a third sidelink message over the sidelink channel, wherein the third sidelink message reserves the second resources for the fourth sidelink message to the second UE; and
   transmitting, to the second UE, the fourth sidelink message over the second resources reserved by the first UE, wherein the fourth sidelink message comprises data for the second UE.

9. The method of claim 8, wherein
   the first resources are exclusive of third resources which a third UE has allocated for a fifth sidelink message to a fourth UE, and
   the second resources are selected from the first resources.

10. The method of claim 8, wherein
    the first resources comprise third resources which a third UE has allocated for a fifth sidelink message to a fourth UE,
    and wherein the second resources are exclusive of the first resources.

11. The method of claim 8, wherein the third sidelink message is transmitted via a sidelink control channel.

12. An apparatus for wireless communication at a first user equipment (UE), comprising:
    a processor;
    memory coupled with the processor; and
    instructions stored in the memory and executable by the processor to cause the apparatus to:
      receive a first sidelink message from a second UE over a sidelink channel, the first sidelink message comprising an indication of first resources of the sidelink channel reserved by the second UE for a fifth sidelink message by the second UE to a third UE;
      transmit, to a fourth UE, a second sidelink message over the sidelink channel, the second sidelink message comprising an indication of second resources of the sidelink channel, wherein the second sidelink message indicates that the second resources are available for selection by the fourth UE for a fourth sidelink message to the first UE or not available for selection by the fourth UE for the fourth sidelink message;
      receive a third sidelink message from the fourth UE based at least in part on transmitting the second sidelink message to the fourth UE, wherein the third sidelink message allocates third resources of the sidelink channel for the fourth sidelink message; and receive, from the fourth UE, the fourth sidelink message over the third resources of the sidelink channel reserved by the fourth UE based at least in part on transmitting the second sidelink message to the fourth UE, the fourth sidelink message comprising data for the first UE.

13. The apparatus of claim 12, wherein:

the second resources of the sidelink channel are exclusive of the first resources of the sidelink channel, and the third resources are selected from the second resources.

14. The apparatus of claim 13, wherein the third sidelink message is transmitted via a sidelink control channel.

15. The apparatus of claim 12, wherein:

the second resources of the sidelink channel comprise the first resources of the sidelink channel, and the third resources are exclusive of the second resources.

16. The apparatus of claim 12, wherein:

the second sidelink message is associated with a time window, and the second resources indicate available resources for the fourth sidelink message within the time window.

17. The apparatus of claim 16, wherein the first resources comprise a set of periodic resources and the second resources indicate resources exclusive of each of the set of periodic resources occurring within the time window.

18. The apparatus of claim 12, wherein the first sidelink message comprises sidelink control information comprising the indication of the first resources.

19. An apparatus for wireless communication at a first user equipment (UE), comprising:

a processor;

memory coupled with the processor; and instructions stored in the memory and executable by the processor to cause the apparatus to:

receive, from a second UE, a second sidelink message over a sidelink channel, the second sidelink message comprising an indication of first resources of the sidelink channel, wherein the second sidelink message indicates that the first resources are available for selection by the first UE for a fourth sidelink message to the second UE or not available for selection by the first UE for the fourth sidelink message;

select second resources of the sidelink channel for the fourth sidelink message to the second UE based at least in part on the first resources and the indication that the first resources are available for selection by the first UE for the fourth sidelink message or not available for selection by the first UE for the fourth sidelink message;

transmit, to the second UE, a third sidelink message over the sidelink channel, wherein the third sidelink message reserves the second resources for the fourth sidelink message to the second UE; and transmit, to the second UE, the fourth sidelink message over the second resources reserved by the first UE, wherein the fourth sidelink message comprises data for the second UE.

20. The apparatus of claim 19, wherein:

the first resources are exclusive of third resources which a third UE has allocated for a fifth sidelink message to a fourth UE, and the second resources are selected from the first resources.

21. The apparatus of claim 19, wherein the first resources comprise third resources which a third UE has allocated for a fifth sidelink message to a fourth UE, and wherein the second resources are exclusive of the first resources.

* * * * *